(12) United States Patent
Drynan

(10) Patent No.: US 12,182,884 B2
(45) Date of Patent: *Dec. 31, 2024

(54) SYSTEMS/METHODS FOR IDENTIFYING PRODUCTS WITHIN AUDIO-VISUAL CONTENT AND ENABLING SEAMLESS PURCHASING OF SUCH IDENTIFIED PRODUCTS BY VIEWERS/USERS OF THE AUDIO-VISUAL CONTENT

(71) Applicant: HOUSE OF SKYE LTD, Whitefish, MT (US)

(72) Inventor: Skye Drynan, Whitefish, MT (US)

(73) Assignee: HOUSE OF SKYE LTD, Whitefish, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/338,948

(22) Filed: Jun. 21, 2023

(65) Prior Publication Data
US 2024/0144392 A1 May 2, 2024

Related U.S. Application Data

(63) Continuation of application No. 17/884,056, filed on Aug. 9, 2022, now Pat. No. 11,694,280, which is a (Continued)

(51) Int. Cl.
*G06Q 50/00* (2024.01)
*G06K 7/10* (2006.01)
(Continued)

(52) U.S. Cl.
CPC ............ *G06Q 50/01* (2013.01); *G06K 7/1095* (2013.01); *G06K 7/1417* (2013.01);
(Continued)

(58) Field of Classification Search
None
See application file for complete search history.

(56) References Cited

U.S. PATENT DOCUMENTS 5,852,823 A 12/1998 De Bonet
5,893,095 A 4/1999 Jain et al.
(Continued)

FOREIGN PATENT DOCUMENTS

CN 102842096 A 12/2012
CN 106355444 A 1/2017
(Continued)

*Primary Examiner* — Kristy A Haupt
(74) *Attorney, Agent, or Firm* — Cowan, Liebowitz & Latman, P.C.; Mark Montague

(57) ABSTRACT

An automated system/method for identifying and enabling viewer selection/purchase of products or services associated with digital content presented on a display device. Products within the digital content are identified and existing product placement data is ascertained. For products that do not include such data, other methodologies, with the assistance of third-party servers, are employed to assess identity and purchase availability. Viewer input designate products to assess or products can be automatically assessed. Viewers initiate purchase of identified products via the display device or other electronic devices controlled by viewers, such as via viewers' smart phones. Various processes for identifying products include use of AI processing, access to data on third-party servers, crowd sourcing and other methodologies. Various techniques for selecting products for purchases are employed including employing 3D codes (e.g., QR codes) alongside presented products to enable other portable electronic devices to facilitate purchase. Other features are described.

13 Claims, 11 Drawing Sheets

Related U.S. Application Data continuation of application No. 17/350,461, filed on Jun. 17, 2021, now Pat. No. 11,416,918, which is a continuation of application No. 17/118,024, filed on Dec. 10, 2020, now Pat. No. 11,049,176.

(60) Provisional application No. 62/962,351, filed on Jan. 17, 2020, provisional application No. 62/959,412, filed on Jan. 10, 2020.

(51) Int. Cl.
| | | |
|---|---|---|
| *G06K 7/14* | (2006.01) | |
| *G06K 19/06* | (2006.01) | |
| *G06N 20/00* | (2019.01) | |
| *G06Q 10/087* | (2023.01) | |
| *G06Q 20/12* | (2012.01) | |
| *G06Q 20/32* | (2012.01) | |
| *G06Q 20/38* | (2012.01) | |
| *G06Q 30/0207* | (2023.01) | |
| *G06Q 30/0226* | (2023.01) | |
| *G06Q 30/0601* | (2023.01) | |
| *G06V 20/00* | (2022.01) | |
| *G06V 20/20* | (2022.01) | |
| *G06V 40/20* | (2022.01) | |
| *H04N 21/478* | (2011.01) | |

(52) U.S. Cl.
CPC .. *G06K 19/06037* (2013.01); *G06K 19/06112* (2013.01); *G06N 20/00* (2019.01); *G06Q 10/087* (2013.01); *G06Q 20/123* (2013.01); *G06Q 20/3276* (2013.01); *G06Q 20/384* (2020.05); *G06Q 30/0222* (2013.01); *G06Q 30/0226* (2013.01); *G06Q 30/0623* (2013.01); *G06Q 30/0633* (2013.01); *G06Q 30/0643* (2013.01); *G06V 20/00* (2022.01); *G06V 20/20* (2022.01); *G06V 40/28* (2022.01); *H04N 21/47815* (2013.01)

(56) References Cited

U.S. PATENT DOCUMENTS

| | | |
|---|---|---|
| 6,240,217 B1 | 5/2001 | Ercan et al. |
| 6,763,148 B1 | 7/2004 | Sternberg et al. |
| 7,827,074 B1 | 11/2010 | Rolf |
| 8,146,126 B2 | 3/2012 | Downey et al. |
| 8,627,379 B2 | 1/2014 | Kokcnos et al. |
| 8,910,201 B1 | 12/2014 | Zamiska et al. |
| 8,949,889 B1 | 2/2015 | Erdmann |
| 9,338,500 B2 | 5/2016 | Briggs et al. |
| 9,530,048 B2 | 12/2016 | Bartlett et al. |
| 9,712,788 B2 | 7/2017 | Downey et al. |
| 9,736,537 B2 | 8/2017 | Piepenbrink et al. |
| 10,068,276 B2 | 9/2018 | Karmalar et al. |
| 10,249,137 B2 | 4/2019 | Washington et al. |
| 10,477,287 B1 | 11/2019 | Fairbanks |
| 10,542,326 B2 | 1/2020 | Grover |
| 10,701,449 B2 | 6/2020 | Barnes et al. |
| 11,049,176 B1 * | 6/2021 | Drynan .................. G06V 20/00 |
| 11,222,062 B2 | 1/2022 | Downey et al. |
| 11,416,918 B2 * | 8/2022 | Drynan .............. H04N 21/4532 |
| 11,570,406 B2 | 1/2023 | Downey et al. |
| 11,694,280 B2 * | 7/2023 | Drynan .................. G06N 20/00 |
| | | 705/14.23 |
| 2006/0025129 A1 | 2/2006 | Wolfman et al. |
| 2010/0028137 A1 | 2/2010 | Argaud et al. |
| 2011/0001648 A1 | 1/2011 | Ohkawa et al. |
| 2011/0013775 A1 | 1/2011 | Hu et al. |
| 2012/0023131 A1 | 1/2012 | Downey et al. |
| 2012/0089471 A1 | 4/2012 | Comparelli |
| 2012/0167145 A1 | 6/2012 | Corvia et al. |
| 2012/0192235 A1 | 7/2012 | Tapley et al. |
| 2013/0003954 A1 | 1/2013 | Vendrow |
| 2013/0185150 A1 | 7/2013 | Crum |
| 2013/0298168 A1 | 11/2013 | Thomas et al. |
| 2014/0258029 A1 | 9/2014 | Thierry et al. |
| 2015/0100989 A1 | 4/2015 | Gellman |
| 2015/0170245 A1 | 6/2015 | Scoglio |
| 2015/0215674 A1 | 7/2015 | Provencher et al. |
| 2015/0245103 A1 | 8/2015 | Conte |
| 2015/0358685 A1 | 12/2015 | Adjcsson |
| 2016/0019626 A1 | 1/2016 | Pham |
| 2016/0165314 A1 | 6/2016 | Singh |
| 2016/0292734 A1 | 10/2016 | Jia |
| 2017/0034244 A1 | 2/2017 | Eschbach et al. |
| 2019/0104325 A1 | 4/2019 | Linares |
| 2019/0122424 A1 | 4/2019 | Moore |
| 2019/0174165 A1 | 6/2019 | Pizzurro et al. |
| 2019/0318405 A1 | 10/2019 | Hu |
| 2019/0349619 A1 | 11/2019 | Hou |
| 2019/0372953 A1 | 12/2019 | Soon-Shiong |
| 2019/0373337 A1 | 12/2019 | Martcll et al. |
| 2020/0234356 A1 | 7/2020 | Rembert |

FOREIGN PATENT DOCUMENTS

| | | |
|---|---|---|
| CN | 106709781 A | 5/2017 |
| KR | 101672907 B1 | 11/2016 |
| WO | 2016/100862 A1 | 6/2016 |
| WO | 2018/048355 A1 | 3/2018 |
| WO | 2018/094201 A1 | 5/2018 |
| WO | 2019/119800 A1 | 6/2019 |

* cited by examiner

SYSTEMS/METHODS FOR IDENTIFYING PRODUCTS WITHIN AUDIO-VISUAL CONTENT AND ENABLING SEAMLESS PURCHASING OF SUCH IDENTIFIED PRODUCTS BY VIEWERS/USERS OF THE AUDIO-VISUAL CONTENT

REFERENCE TO RELATED APPLICATIONS

This application is a continuation of U.S. patent application Ser. No. 17/884,056, filed Aug. 9, 2022, now U.S. Pat. No. 11,694,280, which is a continuation of U.S. patent application Ser. No. 17/350,461, filed Jun. 17, 2021, now U.S. Pat. No. 11,416,918, which is a continuation of U.S. patent application Ser. No. 17/118,024, filed Dec. 10, 2020, now U.S. Pat. No. 11,049,176, which claims priority to U.S. Provisional Patent Application No. 62/962,351, filed Jan. 17, 2020, and U.S. Provisional Patent Application No. 62/959,412, filed Jan. 10, 2020, the entire disclosures of which are incorporated herein by reference in their entireties.

FIELD OF THE INVENTION

The present invention relates to enabling viewers of digital content (e.g., video content, digital displays, audio content) to quickly select and purchase products displayed or otherwise represented by such digital content. More particularly, the present invention relates to processing digital content viewed, read, heard by, or otherwise perceived by users, identifying products for potential purchase, and allowing/enabling users to readily and quickly select one or more of the identified products for immediate purchase. In addition to products, services can be identified for subsequent purchase along with other things.

The present invention can be employed within or by a multitude of electronic devices, including televisions, smart phones, tablets, computers, voice recognition devices/technologies, and other such types of electronic devices. The digital content includes audio-visual content, audio content alone, video alone, still images, e-book type content, audio book type content, and the like. The digital content may be presented in different forms, such as in movies, television programs, commercials and other forms of advertisements, and other audio-visual presentations, whether pre-recorded, live, broadcast, streaming, etc., and other forms of content, including content for virtual reality applications, audio only applications and the like.

Products and services within digital content, and in some instances, non-digital content (e.g., live events, paintings, non-digital signage, etc.) is complex and may entail different forms of data to represent those products/services. The present invention extracts certain products/services for potential purchase by users based on a number of factors. Factors include user preferences, user-physical characteristics, historical activity of users, demographics, product availability, availability of acceptable alternative products, among other things. Products/services for quick selection and seamless purchasing are presented in various ways and via different devices to users as well other individuals associated with those users. The invention pertains to other aspects to be discussed.

The invention also pertains to the computer software and automated systems that carry out the various processes described herein.

SUMMARY OF THE INVENTION

The present invention pertains to processing product or service information included in any digital content (i.e., audio-visual, video, audio, digital print, etc.) or other human, computer, or AI-perceived electronic content, to enable viewers, readers and other users to seamlessly identify and purchase products promoted, displayed, or otherwise referenced within the work, content or as part of the added content. For convenience herein, the term "product" as used herein includes products and/or services.

As explained in greater detail in the Detailed Description section below, the present invention describes numerous embodiments, features and variations of the invention, and provides various non-limiting examples of such embodiments, features and variations. Titles and headers are provided in the Detailed Description section for convenience and for ease of reading. The following represents a non-exhaustive summary/list of the content presented in the Detailed Description section, and is provided herein to illustrate the large number of features of the present invention.

Product Identification: This section describes different types of product placement within digital content that may be analyzed by the present invention, including pre-arranged product placement, dynamic product placement, static product placement, use of computer vision, AI, crowd source recognition, and other methodologies to identify products and services within digital content. If a presented product is unavailable for purchase, the present invention ascertains and presents alternative products for purchase. Alternative products can be identified based on viewer preset preferences or other criteria.

User Interaction—Identification of Products to Viewer: Products for purchase may be automatically presented to a viewer or be presented after some sort of viewer action (e.g., pausing the digital content, touching the touch-screen display presenting the digital content, a verbal command, etc.). Products may be automatically identified for purchase based on a viewer's preset preferences or other criteria to be discussed.

Manner of Display to Viewer of Identified Products: Products available for purchase may be presented to the viewer in many ways. For instance, the product within the digital content itself (e.g., within the show being watched) is visually modified and additional information optionally may be provided. One or more products for purchase can be identified within a separate field of the electronic device apart from the digital content (e.g., above the show being presented). Products for purchase may be provided to other electronic devices, such as the smart phone of the viewer. This information can be provided to individuals or groups identified by the viewer, such as the viewer's friends on a social media platform, and can be provided for specific functions, such as for use within or as a gift registry. These and other manners of presentation/display of products available for purchase are discussed further below.

In accordance with the present invention, each viewer (using their own electronic device) is able to set or preset the who, what, where, when and how products available for purchase are presented, as further discussed in detail.

In some versions/embodiments, a viewer may use a different electronic device to purchase a product being displayed. For instance, the electronic device that is presenting the digital content can employ QR codes (or other unique visual indicators) alongside or in connection with products available for purchase, and the viewer can use a separate electronic device, such as his/her own smart phone, to read the QR code that in turns implements the purchase of the associated product. Rather than purchasing immediately, a viewer can obtain additional information about selected products.

Viewer Preferences: The present invention employs, in multiple embodiments, user/viewer preferences that can be viewer provided preset information, machine-learned viewer preferences, or both. Each viewer, via his/her own account, identifies preferred and non-preferred products/services, styles, materials, colors, brands, foods, genres, travel locations, entertainment preferences, cost preferences, categories of products, etc.

Viewer Selection/Purchase of Identified Products: The present invention provides for a number of ways viewers can select/purchase one or more identified products/services, including use of different types of electronic devices, selection methodologies, including voice commands, hand/body gesturing, etc. Rather than purchase products, viewers can select products for inclusion within different types of gift registries or be sent to selected social media platforms or to particular recipients, such as the viewer's friends. These and other manners of viewer selection are described in further detail.

Gaming and Virtual Reality Environment: Most, if not all the above-summarized and herein-described features of the invention can be implemented within computer gaming systems and virtual reality environments. The present invention enables users/participants of virtual reality apps/systems to purchase the real-life versions (if available) of virtual reality-presented products and services. For example, participants/gamers/users of certain virtual reality apps/systems can purchase real-world clothing and other products that are worn or otherwise used by the players' avatars.

E-Books: The present invention may be employed within E-Books or E-Book environments (e.g., an E-Book app). Products described within textual descriptions are identified and ascertained if available for purchase to enable readers to then readily purchase desired products about which are read.

Other Applications—Outside of Digital Presentation Content: viewers of non-digital content can employ the present invention in the same manner using their own portable electronic devices. For instance, the viewer can take a photo or video of the non-digital content and then arrange for that photo or video to be processed in accordance with the present invention to enable the immediate purchase of a product or service relating to the content of that photo or video.

Further functions and applications are discussed in the Detailed Description section below.

Further Summary of the Invention

Having provided above a summary of various embodiments and features of the present invention, the following further summary characterizes the invention in more technical terms, representing non-limiting embodiments of the present invention.

The present invention, in various embodiments, comprises an automated method for identifying for purchase one or more products and/or services in digital content, comprising the steps of displaying digital content on a display of an electronic display device (e.g., television, smart phone, tablet, etc.), the digital content displaying or otherwise representing at least one product (and usually many products), analyzing the digital content to identify the product(s), ascertaining the existence, if any, of product placement data that is associated with the product, communicating electronically, if there is no product placement data associated with the product, data that represents the identified product or data that corresponds to the product (e.g., such as a screen shot) with at least one external server over a computer network, the external server representing a recognition server that performs recognition processing on the data; receiving recognized product data, such as the identity of the recognized product, from the recognition server that had performed product recognition processing, ascertaining from one or more external servers if/whether the recognized product is available for purchase, and receiving input from a viewer of the digital content to initiate the purchase of the recognized product that has been determined to be available for purchase.

As an aspect of the invention, the display device receives viewer input representing or corresponding to a "viewer triggering action" and the analyzing step is carried out in accordance with the viewer triggering action to identify the product. The viewer triggering action can be the viewer pausing the display of the digital content whereupon the products shown within the paused display are identified and subsequently determined if they are available for purchase.

The viewer triggering action may be specific identification of a particular product by the viewer. Specific identification may be carried out via a remote control, a touch of the display of the display device, a keyboard, a mouse, an audio command, or other form of viewer input. For instance, other form of viewer input can be a hand or body gesture by the viewer during use of a virtual reality device.

As another aspect of the invention, products within or otherwise represented by the digital data are automatically identified without viewer input. In another aspect/variation of the invention, the digital content is analyzed to identify products in advance of the content's presentation to the viewer.

As a further aspect of the invention, product recognition entails the execution of appropriate computer software that analyzes distinct physical features and characteristics of the components within the digital content in order to identify products that are disclosed. Such features may include shape, orientation, color, texture or other attribute. The brand of the product, as described or otherwise represented within the digital content, may be employed.

In accordance with embodiments/aspects that employ product brands, various product databases are utilized to assist in identifying products, and websites and other servers of brand owners or authorized licensees are accessed during product recognition processing.

As yet another aspect of the invention, product recognition processing employs artificial intelligence (AI) methodologies/processes, including AI iterative processes.

As yet a feature aspect of the invention, for products ascertained to be unavailable (e.g., discontinued products), other manners of obtaining presented products are employed, including potentially obtaining products via online auctions, ascertaining suitable alternative products, and/or alternative products acceptable to the specific viewer based on that viewer's preset or otherwise ascertained preferences.

As yet a further aspect, other processes are employed to identify products or identify where difficult-to-obtain products can be obtained, such as via crowd-sourcing methodologies.

In accordance with yet further aspects, the invention may employ physical characteristics of the viewer to select appropriate products (e.g., certain clothing, etc.) for purchase. Such physical characteristics can be provided directly by the viewer, automatically obtained (e.g., via camera systems/processes) or from third-parties that may otherwise already have such information.

As another aspect of the invention, product information regarding products available for purchase may be delivered to different types of electronic devices and the manner of how that information is displayed may be provided in many ways. In one aspect, such information is provided on the display device that is displaying the original digital content. The information may be provided in a manner that visually distinguishes the displayed product from other things presented within the digital content. The information may be provided on a different field or portion of the display device from where the original digital content is being presented. Additional/auxiliary information about each product may also be presented to the viewer, such as price, size, brand, delivery time, etc.

As a further aspect of the present invention, computer-readable one-dimensional (e.g., barcode) or two-dimensional (e.g., QR code) graphical symbols are presented on the display device to enable the viewer to select a desired product for purchase using a different electronic device, such as the viewer's smart phone.

As yet another aspect of the invention, the viewer can designate a product to be added to a gift registry (e.g., wedding registry) that may be used by a viewer designated group of individuals to select and purchase products that are on the gift registry.

As stated earlier, product data can be delivered to other electronic devices, including devices particularly identified by the viewer, including email addresses and other accounts designated by the viewer. The product data can be delivered to viewer-designated social media platforms to enable other individuals to purchase the identified products.

Product data can be delivered to various electronic devices, social media platforms, etc., at any time including after completion of the digital content's presentation (e.g., completion of a television show, movie, etc.), at a time designated by the viewer, or other time. Updated product information can be periodically provided, such as in the case a product currently is not available. In such case, the viewer (and other individuals designated by the viewer) are provided with updates regarding availability. Yet further information about products may be provided, including discounts when available, loyalty program availability and benefits, etc.

As a further feature of the present invention, a viewer can establish a set of preferences so that products available for purchase are presented or, in certain instances, not presented based on the viewer's preferences. Viewer preferences can impact the style, shape, size, color, brand, etc., of products that are presented for purchase. Viewer preferences can be established and/or modified based on historical purchasing activity of the viewer, or other activity such as the viewer's browsing history and other conduct that is performed on any number of electronic devices, including activity within physical stores.

As an additional feature of the present invention, the viewer is able to immediately purchase one or more products via a single viewer action. Various manners of selecting a product for purchase by the viewer are possible.

As yet another feature of the present invention, the viewer's current location, generally based on GPS data of the viewer's portable electronic device (e.g., the viewer's smart phone) is employed to ascertain the products/services available for purchase. For instance, various services are location-based, such as restaurants to frequent, entertainment, tourism and other types of services are specific to location.

As a further feature of the present invention, any of the above-summarized features/aspects may be employed within the electronic book (E-Book) environment (e.g., Kindle or other device, and/or apps operating as an E-Book). The present invention identifies one or more products represented within the textual description of the presented digital content within the E-Book environment. A visual representation of products ascertained to be available for purchase may be presented within the E-Book environment. The content within a given page (or two pages) that is presented to the viewer (e.g., after the viewer "turns" a page) is analyzed and then products represented by that content available for purchase are presented to the viewer. The products can be presented within the E-Book's margins (e.g., outside the text) or placed in another location, such as over/on the text. Other functionality and variations also are applicable to the E-Book environment.

In addition to E-Books, the present invention may be applied within other technological environments, such as E-Magazines, Newspapers, and the many different types of apps that are available on smart phones, tablets, and computers.

Other aspects, features and variations are further described in the Detailed Description section below.

The present invention also pertains to systems and devices that carry out any of the above-summarized processes/steps/functionalities.

In accordance with another embodiment of the present invention, the present invention pertains to an automated system that comprises a first device, a second device, and a server. The first device has a processor, a memory and a display for displaying the digital content. The second device has a processor and an input interface, and the second device is portable and adapted to be operated via the input interface by a viewer of the digital content displayed by the first device in order to select a product associated with or appearing in the digital content displayed by the first device. The server has a processor and memory, and is in communication with the first and/or second devices via a computer network. One or more of these devices executes computer instructions to cause the overall system to identify the viewer, identify one or more products represented within the digital content, ascertain any product placement data associated with the identified product(s), communicate electronically, if there is no product placement data associated with the identified product, data representing the identified product or data corresponding to the product with at least one external server via the computer network, the external server representing a recognition server, receiving a recognized product from the recognition server that performed product recognition processing on the communicated data, ascertaining via data from one or more external servers if the recognized product is available for purchase, and receiving input from the viewer of the digital content to initiate purchase of the recognized product available for purchase.

As various aspects of this automated system embodiment of the present invention, the applicable structure or structures have the functionality of any of the foregoing paragraphs pertaining to the method embodiment(s). Such paragraphs are not repeated herein with respect to the above summarized system embodiment so as to not unnecessarily extend the discussion herein.

Functionality, communication and other structural characteristics and/or software-based characteristics may include or otherwise employ any of the above-summarized features, as well as all additional features and functionality discussed in the Detailed Description presented below.

The present invention further entails additional embodiments, features, aspects, functions, and benefits as described herein. Hence, the above summaries represent non-limiting exemplary embodiments, features, functions, and benefits of the present invention.

Unless expressly stated otherwise, the steps and features can occur at any point in the inventive system/process, including as the initial step or later on after products for purchase are identified, or at other points in time. Moreover, the different described features, aspects, functions, and/or steps may be combined with one another in the different embodiments and combinations discussed herein. Additional features, aspects, and benefits of the present invention will become more apparent and well understood by those of ordinary skill in the art upon reading the following detailed description in conjunction with the accompanying drawings.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
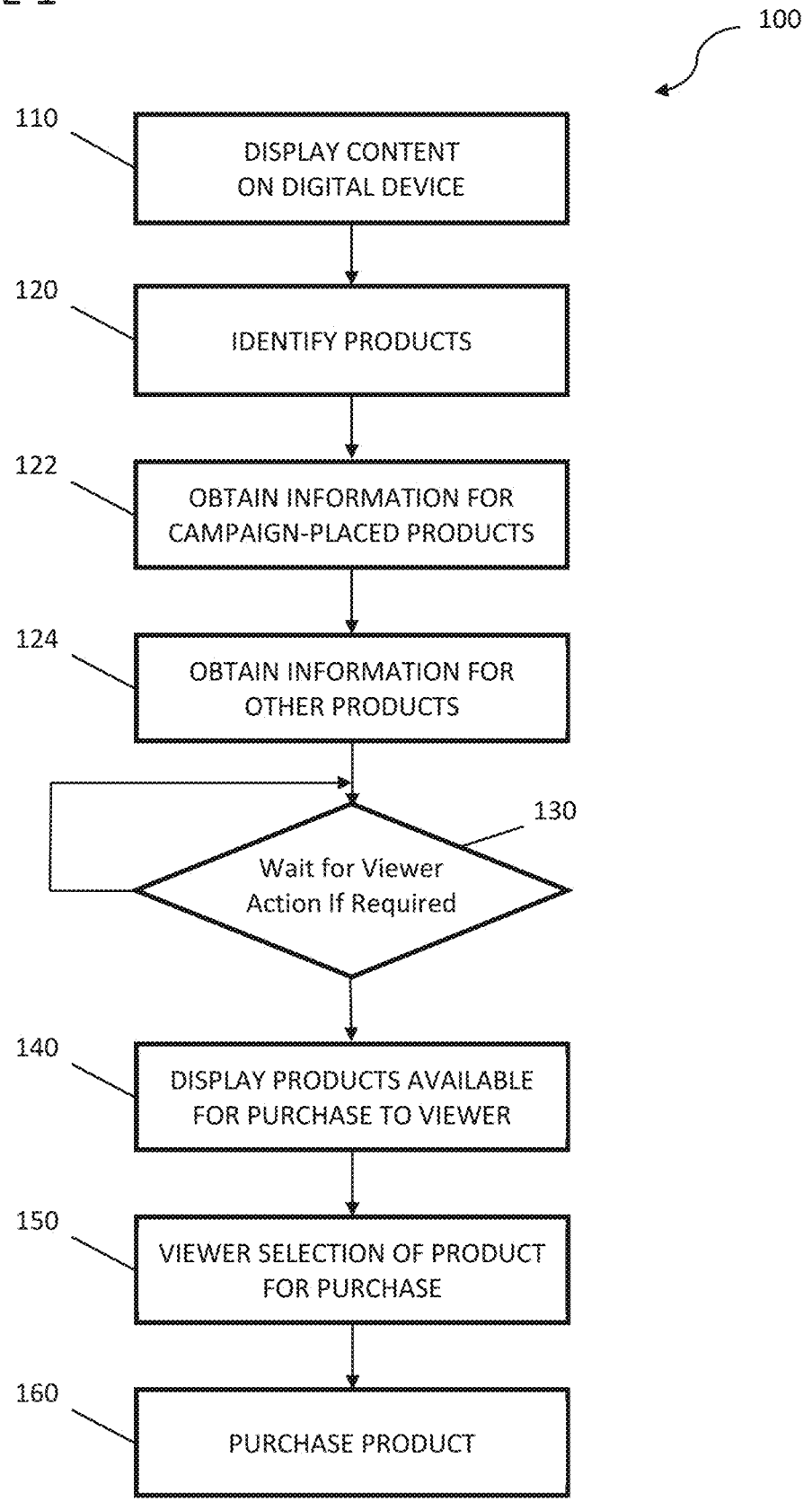
FIG. 1 is a high-level flowchart used to describe various steps and operations of the present invention.

The present invention pertains to systems and methods that allow viewers to easily and quickly purchase products and services displayed or otherwise disclosed or represented within digital content, such as broadcast, streaming or pre-recorded audio-visual content, audio content alone (e.g., within e-books) and the like. The above-summary sets forth various features, functions and benefits of the present invention and the following detailed description supplements that discussion to enable those of ordinary skill in the relevant arts to practice the various embodiments, features and aspects of the invention herein-described.

Definitions

In the discussion herein, the following terms are utilized and the following definitions for those terms are provided to make it clear that certain terms are not to be construed narrowly.

The terms "user," "users," "viewer," "viewers," "reader," "readers," "consumer," "consumers," and the like are used interchangeably herein. Similarly, the terms "viewing," "watching," "reading," "listening to," "hearing," "perceiving" and the like are used interchangeably herein.

Except where otherwise clear or otherwise stated, the terms "video," "video content," "digital content," and the like shall include audio content and, in certain embodiments, represents audio content alone without video content. For example, digital content can refer to, without limitation, an audio-visual work (e.g., a movie, television show, program, commercial advertisement, etc.), an electronic game, streaming content, stored digital content representing audio and/or visual content, virtual-reality environment type content, audio information, audio recordings, e-book application-type data and content, human perceived visual and/or audio content, and AI-perceived content that relates to visual and/or audible information, whether described, displayed, heard, or otherwise perceived.

The terms "product," "products," "service," "services" and the like are interchangeably used herein to refer to one or more products and/or one or more services. Accordingly, reference to a product is provided for convenience during some of the discussion herein, and the applicable embodiments, aspects, features, functionality and/or steps may also be applied, where appropriate, to a service or services.

The terms "one-touch," "single operation," "input" by a user and the like may include any single action or simplified set of actions perceived by a mechanical, electrical, optical, audio, or computing device, such as a "click" on a mouse, depression of a button, a selection or depression of a key on a keyboard or keypad (including a virtual keyboard or keypad), a contact on a touch-screen type device, a voice command received by an appropriate computing device, and a physical gesture also received by an appropriate computer device (e.g., devices employing a camera or other types of sensors that detect movement). These are non-limiting examples.

The types of devices that can receive the one-touch, single operation, or other form of input by a user includes, as non-limiting examples, a keyboard, touchscreen, mouse, input device of a computer, smart phone, tablet or other mobile electronic device, a remote control, key fob, camera system coupled to a suitable computing device, computing system that employs a microphone, movement/motion sensors, optical systems, and devices/systems that include a combination of any of the foregoing.

The term smart phone as used herein includes smart tablets and other like portable electronic devices and includes smart watches and other portable devices capable of wireless communication with other electronic devices.

The term television includes both portable and non-portable video monitors capable of displaying (or projecting) visual content and/or audio-visual content, and includes such electronic devices regardless of their size, placement, and method of mounting (if mounted).

The present invention employs various features, processes, functions and benefits that are achieved by a person (called a viewer or user herein) when (or after) watching or otherwise experiencing a movie, television show, advertisement, video or other digital content mentioned herein (inclusive of reading or listening to a novel, story, etc.). The viewer, after significant processing and analysis as hereindescribed, is enabled to quickly and readily purchase products, services and other things displayed or otherwise associated with what is being perceived by that viewer, and such may be achieved on a wide variety of electronic devices in a variety of manners. The following discussion explains such processing and analysis, and the steps and equipment that are employed to enable viewers to make purchases in accordance with the present invention.

Referring now to the drawings, FIG. 1 thereof shows a basic flowchart 100 that is used to describe the various steps that are carried in the present invention. It is appreciated that not every step identified or described be carried out in the various embodiments discussed, and it is further appreciated that additional steps and sub-steps may be carried out without going beyond the nature and scope of the present invention.

1. Display/View Content

Figure 2:
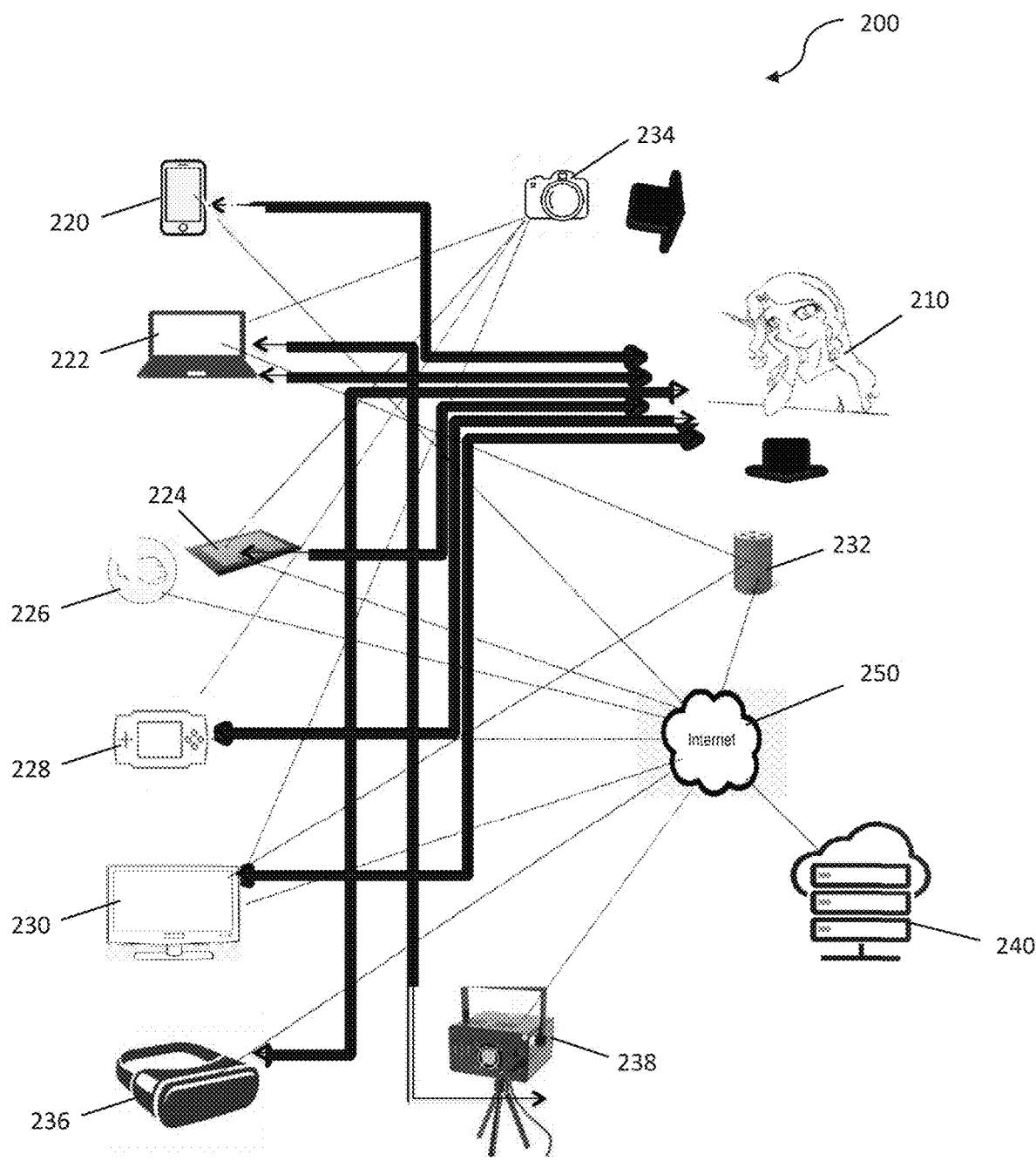
FIG. 2 schematically illustrates exemplary types of devices that may be employed by or within the present invention.

Initially, as represented by Step 110 in FIG. 1, digital content is displayed or otherwise presented to one or more viewers on a particular electronic device. FIG. 2 is a schematic illustration 200 that shows exemplary types of devices that may be utilized, watched, listened to or otherwise interacted by a viewer in accordance with the present invention. For instance, a person (viewer/user 210) can interact with (including watching, reading and/or listening to) a smart phone 220, a computer 222 (whether portable or not), a smart tablet 224 (such as an E-reader device, iPad, etc.), a smart watch 226, a game console 228, a television/monitor 230, and a virtual reality (VR) system 232. These devices are exemplary and viewer 210 can interact with other forms of electronic devices in accordance with the present invention.

Initially, the viewer is watching a movie, television program, show or other form of content. For convenience, the term "show" will be used in the discussion herein to describe the various embodiments and features of the invention, but it is understood that reference to "show" includes any digital content being presented, such as a movie, program, advertisement, etc., whether in visual, audio-visual, or audio form, and whether visually and/or audibly perceived. Moreover, the content being presented can be via any of the foregoing identified devices (e.g., smart phone, computer, smart tablet, smart watch, television, VR system, E-reader, etc.) or other devices capable of providing audio-visual content, visual (alone) content (motion video or static/still), or audio (alone) content.

The manner in which the content is being provided to the electronic device may be in any appropriate manner. For example, the content can be pre-loaded or pre-stored at an earlier time within the electronic device. The content can be in the form of live streaming to the device via the Internet or via another network (e.g., via a streaming service, live streaming a concert or other event, whether a live event itself or prerecorded). The content can be generated by the electronic device via execution of a suitable program (whether being executed by the electronic device or another device in communication with the electronic device), such as is common in game systems and virtual-reality systems. Other manners of distribution or transmission to the electronic device and then display of the content to the viewer may be implemented.

Since various manners of distribution/transmission of digital content and then presentation of that content on suitable electronic devices are well known, further discussion is not provided herein except where necessary for an understanding of the present invention.

2. Product Identification

In accordance with the present invention, one or more products that are displayed within the digital content are identified (FIG. 1, Step 120). As will be discussed, products can be automatically identified by the system carrying out the invention, such as the electronic device that is presenting the digital content. Products also can be manually designated by the viewer. Automatic and/or manual selection/identification of products is further described.

In addition to automatic or manual identification of a product(s) in the digital content, the present invention in its various embodiments allows such identification and subsequent selection for purchase by the viewer to be achieved while the digital content continues to be presented or during a "pause" of the presentation. These different embodiments are described further below.

Prior to discussing the details of product identification (and the selection/purchasing of products by the viewer), the present invention takes advantage and utilizes data/processes/systems that provide so-called "product placement" advertisements and campaigns in which products are intentionally inserted into digital content.

2A. Types of Products within Digital Content

Products are placed in video content in many ways. As a common example, a character in a movie commonly wears clothing and/or jewelry of a particular famous designer and commonly drives an expensive automobile from a high-end automobile manufacturer. As another common example, scenery in a program often includes specific household items of well-known manufacturers. These products and specific information about purchasing the featured products sometimes is made available from merchants, manufacturers or brand owners as part of a so-called "product placement" campaign.

The term "product placement advertisements" within the context of digital content, as used herein, refers to a product placement campaign in which the digital content includes pre-programmed content that promotes specific products in an intentional manner. Two exemplary types of product placement advertisements are: (1) pre-arranged product placements; and (2) dynamically arranged product placements. Products also are arranged statically. These types of advertisements are further explained below.

In accordance with the present invention, the inventive systems/processes ascertain the manner in which a displayed product is included within the digital content, that is, whether statically, pre-arranged, dynamically, or by another known method. Subsequently, information about product availability is ascertained and the viewer is given the opportunity to readily purchase the product irrespective of the manner in which the product was advertised or otherwise presented within the digital content.

Figure 3:
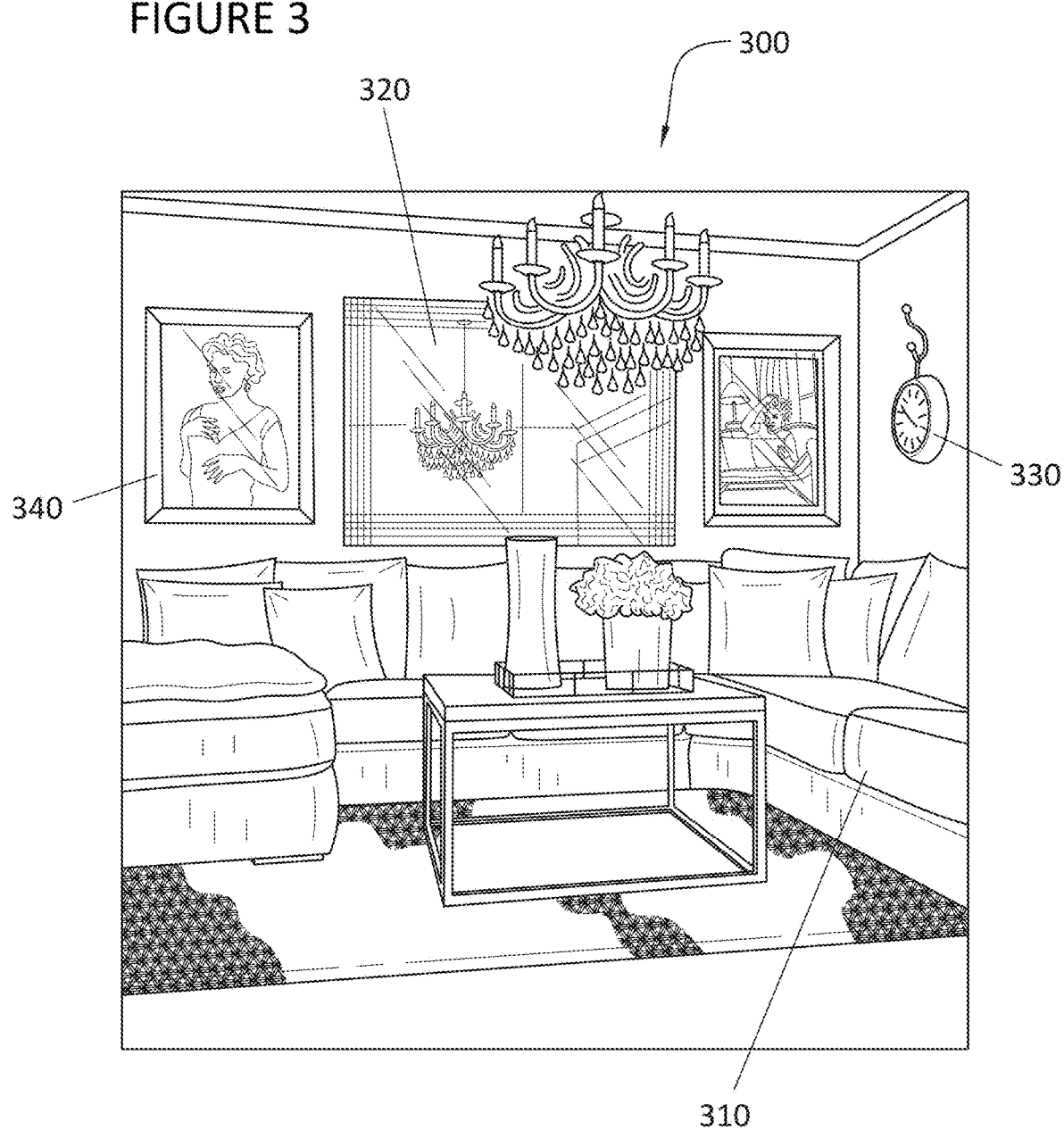
FIG. 3 is a schematic illustration of an exemplary scene 300 within a movie or show used to describe various features of the present invention.

To illustrate and explain different types of product placement methodologies, FIG. 3 is a schematic illustration of an exemplary scene 300 within a movie or show being presented to a viewer. Exemplary scene 300 shows several products, including a sofa 310, a mirror 320, a wall clock 330, and a piece of artwork 340.

Pre-Arranged Product Placement

Pre-arranged product placement pertains to products that appear (or are referenced) within digital content that have been provided (i.e., pre-arranged) by an entity, such as a manufacturer, distributor or retailer, to the producer of the digital content for the specific purpose of using that product within one or more scenes of a program.

In the exemplary scene 300, sofa 310 can be deemed to be such a product that was provided to the producer of the digital content by a supplier of the sofa under the contractual agreement that the product (i.e. the sofa) appear within the digital content in certain ways. Accordingly, the sofa can be purchased from that supplier and information relevant to identifying the sofa, identifying the supplier and perhaps other useful information may be embedded within the digital content and/or be otherwise available from the distributor of the digital content or producer of that content.

As another example of pre-arranged product placement, a "generic" item may be manufactured under several brands and/or be sold by multiple retailers. In the exemplary scene, mirror 320 can be such a "generic" product, but the presentation/use of the mirror within the scene still represents a pre-arranged product placement. In such case, the advertiser(s) of this product, which can be the brand owner, a distributor, and/or retailer(s), coordinated with the content producer to deliver information with the digital content about where the product can be obtained and other information. Various different types of situations may exist, including delivering information (embedded within the digital content) about multiple retailers that supply the product or similar products.

The present invention extracts information about each pre-arranged product. In certain embodiments also to be discussed, in cases where multiple sources of the product are available, the present invention selects the retailer (i.e., source) best suited to the viewer using various criteria including information specific about the user, such as the user's location, the user's preset or otherwise established preferred criteria.

Dynamic Product Placement

Another type of product placement campaign is dynamic product placement, which pertains to "dynamically" inserting particular products within digital content based on any number of factors, including demographics, purchasing conduct and other available information about viewers (i.e., potential consumers) who will be receiving the digital content. In simple terms, dynamic product placement occurs after creation of the digital content and often at the time or just before the digital content is transmitted to viewers (i.e., to electronic devices viewed by those viewers). Accordingly, it is possible (and likely) that different sets of viewers of the digital content will see different things/items (i.e., products placed dynamically).

In exemplary scene 300, wall clock 330 can be an example of a dynamically placed product, whereupon that wall clock is viewed within digital content distributed to selected viewers, but something else (e.g., another type of clock) is dynamically included within digital content and thus viewed by a different set of viewers (on other electronic devices). Examples of something else is a wall clock by a different manufacture, a different type of clock altogether or a different thing altogether. For instance, a show shown in one part of the country may include products at times that are more readily accepted or available in that area, whereas that same show appears in another part of the country with different products in their place that are more readily accepted or available in that other part of the country. Other scenarios and reasons why dynamic product placement is used exist.

Dynamic product placement may be even more granular. Viewers with different profiles (at least as known to the transmitting entity) may themselves be provided with different products on their respective electronic devices based on those different profiles. Dynamic product placement also may applied to the particular times at which the digital content is transmitted and viewed (e.g., early evening versus the late-night crowd). Purchasing habits vary based on differing demographics of viewers and advertisers seek to use those differing demographics to their advantage. This may include the type of clothing one appears to be wearing in digital content, color, type of fabric, particular cost of the product, and other things that can be dynamically modified within digital content prior to its transmission to viewers' electronic devices.

Information about dynamically placed products often is embedded within the transmitted digital content, including the product's brand, manufacturer and other information. Moreover, dynamic product placement delivery often occurs via an advertisement delivery server over the Internet or other network, and the delivery server will have relevant information about the dynamically placed products that it has transmitted.

As will be further described, the present invention identifies dynamically placed products, extracts all relevant information in connection with those dynamically placed products, including if appropriate access to information available to advertisement delivery services, and utilizes the extracted and otherwise obtained information in manners that best suit viewers in purchasing activity in accordance with the present invention.

Other Forms of Product Placement

In addition to pre-arranged and dynamic product placement, other forms of product placement campaigns are used in broadcast and other industries that seek to maximize advertising revenue. For example, so-called Re-placement advertising pertains to replacing content (usually products) in already created content (i.e., usually older digital content) with contemporary products. Product displacement entails hiding or replacing a brand (e.g., a brand logo on a product) with another brand. There are other forms of known product placement campaigns and methodologies.

In each of these forms of product placement campaigns, transmitted digital content often includes embedded within it information that relates to the product placement campaign/methodology and includes relevant information about the applicable products. Moreover, third party services, such as the above-mentioned advertisement delivery services, also have data relevant about products included within transmitted digital content. As discussed, the present invention seeks to extract, obtain, and utilize such information to assist in various functions, including identifying products with particularity, identifying relevant information about those products (e.g., cost, source, etc.) and identifying availability for purchase of those products, among other purposes discussed herein.

Products without Product Placement Data

In many instances, products that appear within digital content are not part of a product placement campaign. That is, there is absolutely no information (or at least no embedded information) within the transmitted digital content about a displayed or otherwise referenced product. This is almost always the case for much older digital content.

In exemplary scene 300 in FIG. 3, artwork 340 can be an example of the type of product that was not placed within the digital content as part of a product placement campaign. That is, except for the image of the painting itself, there is no information embedded within the transmitted digital content or information available from a third-party advertising service or other entity that assisted, in one way or another, with the transmission of the show that contained that scene.

As will be discussed, the present invention identifies products that are not part of a product placement campaign in manners quite different from how products that are part of a product placement campaign are identified, and then proceeds to ascertain whether such products are available for purchase by the viewer.

Additional Information Embedded/Associated with Digital Content

Apart from the different type of products that appear with digital content, some digital content includes other information that may be employed by the present invention. For instance, shows that relate to interior design may include embedded data about the designers, photographers and other individuals/companies who had a connection with developing the content. This sometimes is included within the credits portion of the content, but sometimes not. Data embedded within the digital content may further include entities that provide services relevant to the digital content and other information that may be helpful in connection with the present invention.

2B. Identifying/Obtaining Product Information

Having provided basic descriptions of various product placement campaigns, the present invention proceeds to identify products within the digital content displayed or otherwise perceived by a viewer (FIG. 1, Step 120). In certain embodiments, the electronic device presenting the digital content carries out the various processes described herein. In other embodiments, separate processors in communication with the device presenting the digital content carry out such processes. In yet other embodiments, equipment distinct and not in communication (not in direct communication) with the device presenting the digital content carry out such processes. Such devices/servers/computing equipment are further discussed in the following sections.

Regardless of the particular equipment that is employed, the present invention entails determining whether an item within the presented digital content is indeed part of a product placement campaign and, if so, ascertains relevant information about that data (FIG. 1, Step 122).

In accordance with the present invention, the system ascertains if the presented digital content includes pre-arranged product placement data. Such data represents information about products that are used at the time of creation of the show (or other content) being watched and data relevant to the pre-arranged products are embedded within the digital content. Accordingly, the invention extracts the embedded data to identify the pre-arranged products and to identify information relevant to such identified pre-arranged products. The invention further accesses, if necessary, content in available catalogs or databases that accompany the digital content, are referenced by the digital content, and/or are otherwise found by the inventive system using the relevant information that is available.

The inventive system ascertains if the digital content includes dynamic product placement and extracts from the digital content data relevant to the dynamically placed product, such as the actual image of the product, its brand and/or other information about the product including size, color, markings, shape, source, etc.

The system of the present invention accesses remote servers to obtain yet additional information about the dynamically placed product. When accessing such remote servers, such as those controlled by or regarding, for example, the brand owner, selection of the applicable within the remote server may result in further information about the product, including availability and/or redirection to another entity with yet further information about the product, including availability. For instance, the inventive system may be redirected to a retailer server (or the distributor's or that of another entity). For example, communication with a remote server may be achieved via the Internet or a LAN network, and exchange data in a form of web pages, Java, Java Script, .NET, Silverlight, Flash or other applet or communication format.

Links and/or references within the digital content that are associated with the dynamically placed product are also employed by the inventive system to access sites/servers of third parties with yet additional relevant information about the product, including availability, cost, and other information.

Moreover, in accordance with the present invention, user preferences (further discussed below) are employed to gain information relevant to the user's preferences, including use of redirection to third party servers based on user preferences.

The inclusion of information about products within digital content is carried out in certain known applications, including by Instagram and Pinterest, which embed within images and video content links to websites that provide product information about what is displayed.

Product placement methodologies in digital content and particular methods of extracting data about such products are described in multiple patents, published patent applications and other published materials, and the present invention may employ any of such methodologies as appropriate. Representative patents include U.S. Pat. No. 8,910,201, entitled "Product Placement in Digital Content"; U.S. Pat. No. 8,949,889, entitled "Product Placement Content"; U.S. Pat. No. 9,338,500, entitled "Interactive Product Placement System and Method"; U.S. Pat. No. 10,701,449, entitled "Providing Product Information During Programs"; U.S. Pat. No. 10,542,326, entitled "Targeted Content Placement Using Overlays"; U.S. Pat. No. 10,477,287, entitled "Method for Providing Additional Information Associated with an Object Visually Present in Media Content"; and U.S. Pat. No. 10,249,137, entitled "Dynamic Placement of In-Game Ads, In-Game Product Placement, and In-Game Promotions in Wager-Based Game Environment," U.S. Published Patent Application No. 2019/0378369, entitled "Computer-Implemented Methods and Regulated Gaming Machines Configured for Coordinated Placement of Ads"; and 2014/0255003, entitled "Surfacing Information About Items Mentioned or Presented in a Film in Association with Viewing the Film," each of which is incorporated herein by reference. Additional patents, published applications and other published materials that describe methodologies for identifying and extracting product placement data within shows exist.

Also in accordance with the present invention, product identification may be carried out by computer vision or other known technology/process to identify individual articles of commerce within the digital content. Such processes, which sometimes are called product recognition processing herein, are carried out if the presented digital content is not part of a product placement campaign (FIG. 1, Step 124). However, such processes may be carried out for products that are part of a product placement campaign, particularly if utilizing any embedded data or other information available via the product placement campaign does not enable the system to ascertain a source for the product.

The process to identify articles of commerce within the digital content may be carried out prior to the digital content being presented, while the viewer is perceiving the digital content, upon manual selection by the viewer of an item or article within the digital content, or manual pausing of the digital content, or at another time as herein discussed.

Figure 4:
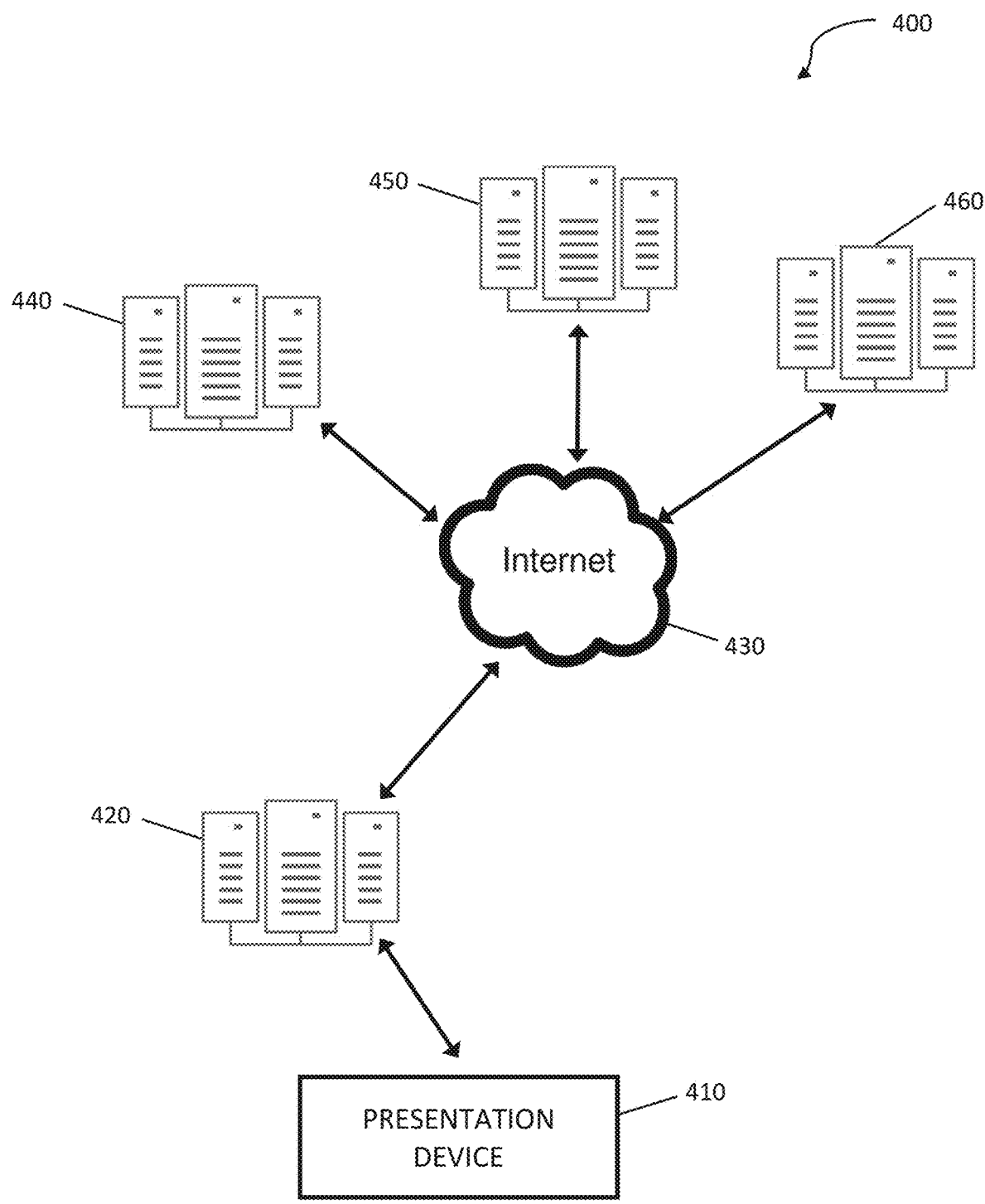
FIG. 4 is a schematic diagram of various devices and servers used by the present invention.

Referring to schematic diagram 400 in FIG. 4, a select frame (or select frames or sections) of the digital content is transmitted from the electronic device 410 (presentation device 410) that is presenting the digital content to the viewer to a recognition server 420 that carries out the above-mentioned computer vision methodology or other suitable image process/analysis. The recognition server's processor performs one or multiple main processes depending on the circumstances. For instance, in the case of when a frame of video content is received, different potential articles first must be identified followed by ascertaining specific information about each identified article. In other cases, one or more articles are already identified but more information about each still is needed.

The recognition server executes suitable software within an incorporated ASIC circuitry that compares each article (i.e., image of an article) with visual images of products within various available databases. Additional searching over the Internet 430 may be carried out if necessary to uncover similar images with the same or similar visual characteristics. For example, a piece of artwork may be particularly identified based on a number of characteristics including color/shape/contour of patterns within the images, edge characteristics, density, arrangement of elements within the image and/or other features and characteristics that may be used for product identification purposes.

Details of various types of such processes can be found in U.S. Pat. No. 6,240,217, entitled "Digital Image Processing"; U.S. Pat. No. 6,763,148, entitled "Image Recognition Methods"; U.S. Pat. No. 5,983,237, entitled "Visual Dictionary"; U.S. Pat. No. 5,893,095, entitled "Similarity Engine for Content-Based Retrieval of Images"; U.S. Pat. No. 5,852,823, entitled "Image Classification and Retrieval System using a Query-by-Example Paradigm"; U.S. Published Patent Application No. 2020/0273013, entitled "Systems and Methods of Product Recognition Through Multi-Model Image Processing"; U.S. Published Patent Application No. 2019/0318405, entitled "Product Identification in Image with Multiple Products"; U.S. Published Patent Application No. 2018/0197223, entitled "System and Method of Image-Based Product Identification"; U.S. Published Patent Application No. 2018/0005294, entitled "Product Identification Based on Image Matching"; U.S. Published Patent Application No. 2016/0371557, entitled "Image-Processing Apparatus, Date Identification Apparatus, Image-Processing Method, and Computer Program Product"; U.S. Published Patent Application No. 2016/0260057, entitled "Product Identification via Image Analysis"; U.S. Published Patent Application No. 2016/0188634, entitled "Product Identification via Image Analysis; U.S. Published Patent Application No. 2016/0027091, entitled "Product Identification Based on Location Associated with Image of Product"; U.S. Published Patent Application No. 2013/0174195, entitled "Systems and Methods of Image Searching"; U.S. Published Patent Application No. 2012/0183185, entitled "Product Identification using Image Analysis and User Interaction"; U.S. Published Patent Application No. 2011/0002535, entitled "Non-Product Image Identification"; and U.S. Published Patent Application No. 2010/0086192, entitled "Product Identification using Image Analysis and User Interaction"; each of which is incorporated herein by reference. Some of these documents discuss recognition of actual products (not just digital representations thereof), and application thereof is discussed in certain embodiments below.

Product identification methodologies are further available via websites, apps and services of third-parties, including Google's Reverse Image Search at—www.images.google.com; Google's API Cloud Vision at https://cloud.google.com/vision; TinEye's Reverse image search at tineye.com; Eyeem's computer vision API at Eyeem.com; and IBM's Watson Image Recognition system/services at https://www.ibm.com/cloud/watson-visual-recognition, each of which is incorporated herein by reference. Other methodologies/systems that may be employed are yet known and described in other patents, published applications, and published articles.

In certain instances, a brand may be associated with the product/element. For instance, the brand may be visually presented in connection with the product or may be spoken while the product is being presented to the viewer, or within metadata or other information embedded with the digital content or provided in some other manner. In such case, searching/analysis performed by the recognition server 420 (or by another server involved in the process) communicates with servers 440 of the brand owner, servers 450 of licensees of that brand, and/or servers 460 of retailers and other authorized sellers of that brand, and/or other databases that contain information relevant to that brand.

By communicating with any of the foregoing entities/databases, the recognition server ultimately seeks to ascertain: (1) one or more retailers or other sellers from which the product can be purchased; (2) cost information; (3) availability information (e.g., available now, whether on back-order, if unavailable, shipment time, etc.; (4) relevant information about the product itself (e.g., color, size, material, and other relevant specs about the product); (5) options available (if any) that pertain to the product (e.g., different colors, sizes, etc.); and (6) alternative products.

As further discussed below, some of the searching/analysis may be based on user preferences and/or other information about the user. For instance, the user's location may be relevant to delivery of the product in interest and, in such case, searching of sellers of the product relatively close to the viewer may be carried out.

In accordance with the present invention as will be discussed further, viewer preferences including physical characteristics of the viewer are taken into account during product assessment and selection. In the context of clothing and other items where the physical characteristics of the viewer have relevance, 3D imaging of the user and/or other relevant data will be employed.

The recognition server may employ artificial intelligence (AI) software in its processes to identify products/elements within the digital content and/or to identify the specific products that are associated with what is being perceived by the viewer. Some of the documents incorporated herein by reference describe the use of AI.

Based on the type of product, user preferences and other criteria, the recognition server identifies one or more specific products that are available for purchase for subsequent presentation to the viewer. The particular manner(s) of presentation to the viewer is discussed in the sections that follow.

In some instance, the recognition server selects a single product for presentation. In other instances, multiple products are selected for presentation. In some instances, information about multiple sources of the product is provided.

In each case, all data relevant to each product is ascertained and transmitted to the presentation device or another electronic device. As will be further discussed, a perceived product can be purchased via the viewer's use of a different electronic device, such as via his/her smart phone. Various manners of purchasing and the different equipment that may be employed in the various embodiments of the present invention will be discussed.

As mentioned earlier, AI may be employed in certain embodiment. For instance, the processor may execute software that includes self-learning AI algorithms that conduct a comparative analysis that compare the product presented in the digital content with images or descriptions in various product databases. In some embodiments, the comparisons generate additional search requests. In this iterative process, the AI analysis determines and evaluates a highly similar suitable alternative product for purchase by the viewer. In cases that established a number of potential alternatives, AI analytics are employed based on user preferences to establish the closest and/or most preferred to those user preferences.

For example, alternative products may be those that have all but one characteristics of the presented product. Characteristics may include size, style, color, pattern, type of fabric/material, year of manufacture, upgraded (or downgraded) version, etc. If deemed acceptable, alternative products may include those that are different with respect to more than one characteristic. If suitable alternatives aren't available that have all but one characteristic of the presented product, then alternative products that have fewer characteristics in common are searched and assessed for suitability. Viewer preferences may also drive how different suitable alternative products may be from the product that is presented.

The viewer's purchasing habits may be taken into account with respect to acceptable alternative products. Moreover, positive (or negative) feedback by other consumers may be employed.

In addition to the foregoing, the present invention in certain embodiments analyzes the context in which a product is presented and utilizes that context in the product search. AI designed particularly for context may be employed for this purpose. As one simple example, a show that pertains to travel to a particular destination may employ the month or season during which the show took place in the invention's assessment of providing one or more potential services from which the viewer may select to purchase and/or to be provided more information about.

AI software/systems may further reference ratings and recommendations by respected third party services, such as travel rating companies, publishers of travel guides, etc., as well as review by individuals who have purchased the product (or service) relevant to the search being conducted.
Services The present invention enables viewers with the ability to purchase services that are presented within digital content. Common services include travel to a particular destination, modes of travel (e.g., airline services; cruise ship services, etc.), restaurant services (e.g., particular restaurants), hotel services, entertainment services (e.g., tourist attractions), and the like. For such types of services, information and potential purchase relate to destination travel packages, travel reservations/purchase, restaurant reservations, hotel reservations, etc.

As another example, educational-related services may be offered to the viewer while watching an educational show, such as a cooking show, and the many other types of educational shows that exist. Related classes that are relatively close to the current location of the viewer can be offered, among other service-related offerings.

The present invention also enables viewers to consider and purchase services that relate, in one way or another (but not necessarily strictly directly related), to the presented digital content. For instance, while watching a broadcast concert (whether live or not), the present invention in certain embodiments ascertains information relating to the purchase of tickets to future concerts with those performers. Such tickets may be for in-person attendance of a future concert or remote attendance, or for other services that relate to the performers (e.g., to meet in person at a different function). As another example, services (and/or products) that relate to future performances at that particular venue may be presented for purchase.

In the sports context, both sports-related products and sport-related services can be offered for purchase while watching a sporting event, a news program reporting on that sporting event, and the like. Dating-related services may be provided during any number of types of digital content, including dating programs, watching romantic-type shows, etc. For instance, the inventive system can direct the viewer to an appropriate dating service, such as Tinder, Grindr, Bumble, etc.

A viewer's preferences, historical purchasing and past viewing habits, and current location may be employed to assess the type of product/service to offer viewers. For instance, the types of restaurants that are presented to a viewer may be based on viewer's preferences (e.g., preferred foods, dishes, types and ethnicities, allergies, etc.) as well as past activity. The viewer's place of residence or current location will be employed in assessing the types of services to offer for purchase.

Similar to ascertaining alternative products if the presented product is unavailable (or the viewer desires to also see alternative products based on viewer preferences or historical activity), the present invention searches and presents to the viewer alternative services. The use of AI is particularly useful in this context in light of the potentially large number of alternatives services (or products in certain cases) that are not identical to but otherwise are similar to some extent to what is being particularly presented to the viewer. User preferences, historical purchases, historical viewing activity, demographics and other features and characteristics may be taken into account.

Moreover, time and date may be taken into account in connection with services (and, if applicable, products) where time and date have relevance. The current season, the weather, and the like may be employed. This is especially true for travel-related services, restaurant services, etc. Other characteristics that are considered include the viewer's preferred/acceptable price range for the product/service in question, preferred extras (if available), and the like.
Viewer 3D Image Set and Similar Data As briefly mentioned above, a 3D image of a viewer may be taken into account with respect to the selection of suitable products for purchase, or selection of size and other characteristics, by the invention. Accordingly, the present invention may utilize any data regarding the physical characteristics of viewers, such as body scans, contour information, color tone, hair color, style, and length, size, height, dimensions, etc. This information may be stored by the present invention or be stored at a third-party site that is accessible by the present invention. As mentioned earlier, such information will be employed in certain embodiments during the selection of goods (and possibly services) being presented within the digital content.

If such data is unavailable or limited, the present invention in certain embodiments queries the viewer for relevant information either during user setup of an account or at a later time, such as when presenting a relevant product for purchase. Answers to queries and/or historical purchasing activity will be included within viewer profiles.

Crowd Sourcing & Auctions

In accordance with the present invention, in certain embodiments, a product is identified or further information about a product is ascertained by posting queries to a "crowd sourcing" platform, appropriate social media channels, and/or chat rooms that are likely to provide useful feedback (e.g., we-talk.com). The "crowd sourcing" post will ask participants to help identify the unknown item, based on an image or description (if known) of the product, provide additional information about the product, and/or provide a potential supplier of that product. In addition, the queries may include recommended or potential alternative products, leading to a gain of potentially useful information about the product itself and/or potential alternative products to present to the viewer.

In certain embodiments of the present invention, any of the herein-mentioned searching may include searching of online auction databases and/or associated websites, such as eBay, TheRealReal.com, Alibris books, among other suitable online auction platforms, as well as searching databases and websites associated with antique dealers or auctioneers, such as 1stdibs.com, among others. Auctions and the like may be employed to obtain products that are no longer available for purchase, or no longer available from the original manufacturer or retailer.

3. User Interaction—Identification of Products to Viewer

The foregoing sections describe identifying products within digital content and ascertaining information about those products including their availability in accordance with the present invention. All this information is presented to the viewer (FIG. 1, Step 140) in various manners in accordance with the present invention.

In accordance with one set of embodiments, products are identified to a viewer in response to a viewer action. As discussed further below, a viewer action may be a pause of the presentation of the digital content. In another version, the viewer uses a pointing device of some sort (e.g., a mouse, a remote control, etc.) to point to or hover above a particular product of interest. Upon these viewer actions, one or more products available for purchase are presented to the viewer. Other scenarios and versions will be described.

In accordance with another set of embodiments, products are identified to the viewer without viewer action. In one version, products available for purchase are automatically presented to the viewer as the digital content is viewed, and there are several manners of how products are indeed presented in accordance with the present invention. In another version, select products are sent to another electronic device. Multiple other versions also are described and included within the present invention.

3A. Viewer Action

In certain embodiments of the present invention, while the viewer is perceiving the presented digital content, products available for purchase are not distinguished from other things presented to the viewer until the system receives some sort of viewer action (FIG. 1, Step 130). For example, while the viewer is enjoying a movie that is being played on his/her television (or other electronic device), the movie is presented without modification. Only after the viewer commences with a certain action does the system present/identify products that are available for purchase.

In one embodiment, the viewer action is a pausing of the presentation of the digital content. For convenience, a viewer action that causes the presentation of one or more products available for purchase is also called herein a "viewer triggering" action. Hence, a viewer simply selecting the pause button on a television remote control, selecting pause on a digital player, or performing an equivalent action (including a verbal command that causes the presentation of the digital content to pause) constitutes a viewer triggering action in accordance with the present invention.

Another type of viewer triggering action in certain embodiments is the use of a pointer device to point to or hover above (or other equivalent) a particular product within the digital content. This may include physical contact to a touch-screen displaying the digital content or a touch-screen otherwise associated with another device that is presenting the digital content. A television remote control with pointing capabilities likewise may be employed. Voice instructions, a computer mouse, and other equipment may be employed for this purpose.

In accordance with the present invention, along with the user carrying out a triggering action, the user can select one or more than one presented product to assess whether that product (or products) is available for purchase. Using a pointer of some sort (e.g., mouse, remote control, touch of a particular portion of a touch screen, etc.), the product particularly pointed to (i.e., selected) within the digital content is then determined by the invention to assess whether that particular product is available for purchase.

In other embodiments, the viewer can verbally describe the product, which is heard by a suitable system that converts speech to understandable computer language. Systems that accept voice instructions, voice queries and the like are well known in the art and further description thereof is not provided except where necessary for an understanding of the present invention.

For instance, while watching a movie, program, etc., a viewer can verbally say "pause" or say another suitable command to cause the movie (or program, etc.) to pause, and then the viewer verbally provides a follow-up instruction to identify one or more products being presented. For instance, the viewer can say "blue dress" or "shoes" or other product, which causes the system to identify such products within the image being presented, and proceed to ascertain information about such products and ascertain when those products are available for purchase in manners previously described. To prevent the system from "hearing" words not intended for the system, a suitable command word may be employed in advance of identifying each product of interest.

In another embodiment, upon pausing the presentation of the program, all products within the paused digital content are assessed by the present invention. For convenience, assessing all products (and services) within paused digital content is referred to herein as "snapshot" processing. In the context of video, the paused digital content corresponds to a video frame.

The viewer can select a product for assessment by other means, such as by pointing to it via a suitable pointer, as stated earlier. For example, with touch-screen devices, the viewer can simply touch that portion of the display that includes the product of interest. Based on user preferences (or preset otherwise), the program can pause or the program can continue. Meanwhile, the inventive system ascertains information about the product and particularly whether it is available for purchase.

The viewer can select multiple products simultaneously or in succession. For instance, the viewer can draw (with one's finger or a pointer or another device) a circle (or oval, box, etc.) around a part of the presentation and all products within that circled area are identified and assessed for availability of purchase.

In any of the embodiments described, as appropriate, the digital content can remain paused until the purchase of one or more products by the viewer is completed. In other embodiments/variations, the digital content continues while information is being provided to the viewer and the subsequent potential purchase by the viewer. For instance, the digital content continues and information about the product (e.g., its price) is simultaneously displayed to the viewer (e.g., in a separate screen or in other manner to be discussed). Accordingly, the present invention allows for the continuous viewing of digital content while enabling a viewer to simultaneously select and subsequently purchase products within that digital content. As will be described, information about a selected product can be presented to the viewer via a different electronic device.

3B. Identification of Products without Viewer Action

In accordance with other embodiments of the present invention, products are identified to the viewer without viewer action.

In select embodiments, as the digital content is presented, products that have been part of a product placement campaign as discussed above are identified with information regarding their availability for purchase. Manners of presenting such information regarding availability for purchase is discussed in the sections below. In these particular embodiments, pre-arranged and/or dynamically arranged products, as they appear within the presented digital content, are identified and data about such products are gathered for presentation to the viewer. Since information regarding those types of products are, in many instances, readily available, product availability information can be presented nearly instantaneously with the presentation of those products.

In certain embodiments, the system particularly identifies those products that are associated with user preferences. For instance, viewers can pre-select products of interest in advance of viewing digital content. Such pre-selection can be done at any time and may or may not have a connection with particular digital content being viewed. For instance, a viewer can indicate a preference to see product availability for dresses of a select color. Countless other examples exist. Accordingly, as the digital content is presented to the viewer, products that are identified to be the same (or similar to) or otherwise have a connection with a preset user preference are automatically identified by the system, information about product availability is ascertained, followed by the system presenting such information to the viewer.

In other embodiments, a catalog of products available for purchase is developed as the digital content is presented, and then such catalog is presented to the viewer in one form or another at a later time. In light of the rather large number of potential products for purchase that are presented within digital content of some length (e.g., within a two-hour movie), certain filters may be employed to limit the number of products that are presented to the viewer for purchase. As stated earlier, this can be achieved via user preferences. The viewer can also identify particular products or select classes of products of which there is no interest. Hence, the viewer can preselect products (or a class of products) to filter out.

In certain embodiments of the invention, the inventive system/method is designed to analyze the digital content in advance of being presented to ascertain products for purchase. For instance, as the digital content is initially being presented or before presentation (e.g., while being downloaded, streamed, etc.), portions of the digital content to be presented at a later time (e.g., later segments of a show or movie) are analyzed in advance of being presented to the viewer. To facilitate such analysis, the present invention in certain embodiments may employ multiple external systems/servers that perform identical analysis functions, but where each external system/server is analyzing a different portion of the digital content being presented. Hence, the present invention in various embodiments considers the temporal nature of the digital content.

With such embodiments, digital content is divided into multiple segments or sections, with each segment being of a certain suitable length of time or, alternatively, a certain amount of digital data. Then, each segment is analyzed separate from other segments, either by the same system or by different systems. Accordingly, by having different segments of the same digital content be analyzed by different processors/servers/systems, product identification followed by presentation of products for purchase and associated data, if any, is achieved even in cases where digital content may include a rather large number of products for purchase.

In certain embodiments, in cases where the system is unable to promptly indicate whether a presented product is available for purchase, such information (once obtained) may be later presented to the viewer. Based on user preferences or default settings, once obtained, information about a particular product's availability can be presented while the digital content still is being presented (but at later time when the product was presented) or once the entire presentation of the digital content is complete.

4. Manner of Display to Viewer of Identified Products

Having described identifying products that are presented (as well as will be presented) within digital content and ascertaining information about those products including their availability for purchase, the present invention displays those products to a viewer (FIG. 1, Step 140) in different manners in accordance with various embodiments of the present invention.

As will be described, in various embodiments, the manner of display of products for purchase can be preset by default, preset via user selection, or established in another manner.

Figure 5A:
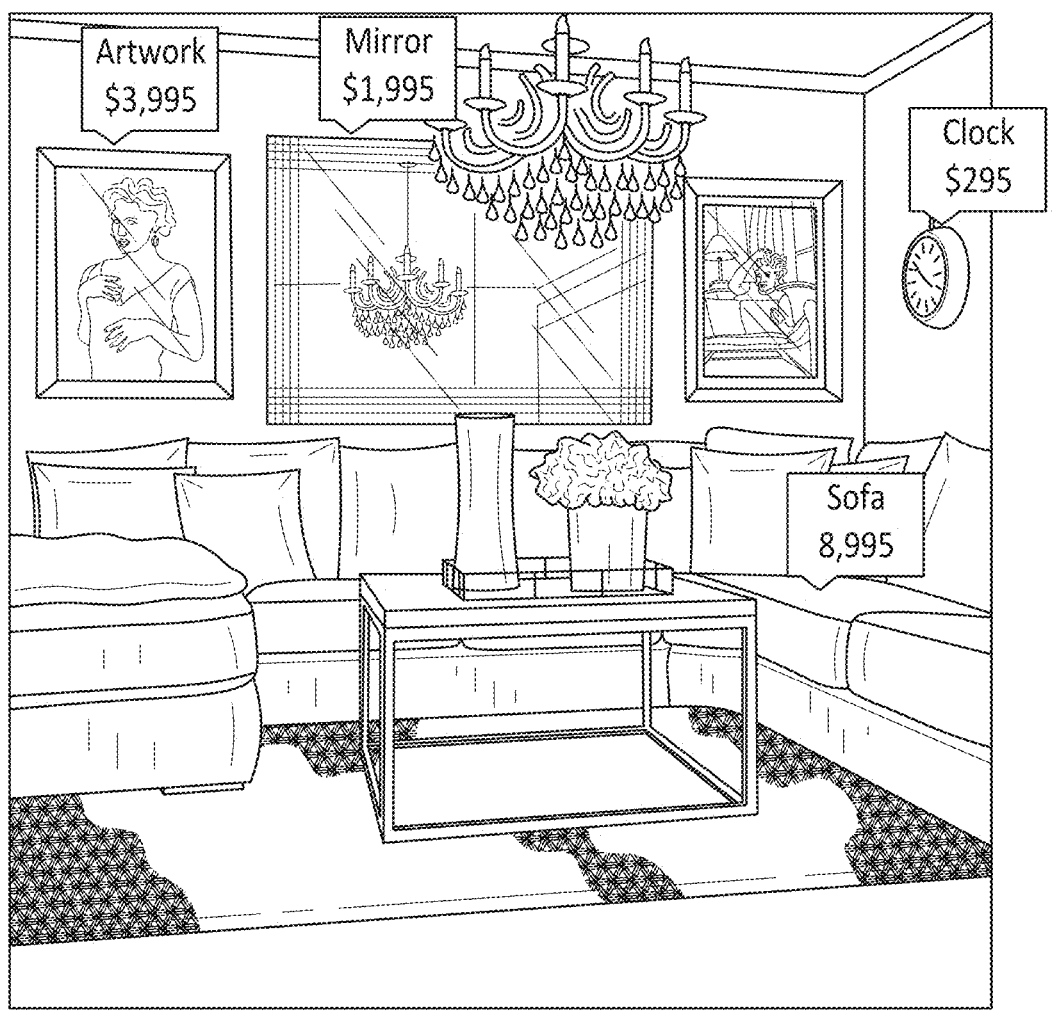
FIGS. 5A, 5B, and 5C schematically illustrate exemplary manners of identifying products for purchase in accordance with the present invention.

The present invention in certain embodiments changes the visual display of a product that can be purchased. As shown in exemplary FIG. 5A, information is superimposed over the image that identify the products for purchase, along with other information (sometimes called auxiliary information herein) such as their price. Different information may be provided and the style and manner of presentation of such information may be different than that shown in FIG. 5A.

Figure 5B:

In other examples, each product may be highlighted, brightened, dimmed, changed in color, made monochrome or otherwise modified in appearance relative to the rest of the presented digital content. In a variation, the rest of the digital content is modified in appearance, such as dimmed, changed to monochrome, etc., so that the product for purchase stands out to the viewer relative to everything else being presented. FIG. 5B shows an example that shows the image darkened except for the artwork to make the artwork standout and that further provides the artwork's price.

In yet other versions, the appearance of the product for purchase is modified in one way (or in multiple ways) and the rest of the digital content is modified (in different ways) to further make the product for purchase stand out to the viewer. For instance, the product for purchase is brightened while, at the same time, the rest of the digital content is dimmed.

Figure 5C:

In accordance with other embodiments, a visual indicator recognized by a viewer can be presented around the product for purchase. For instance, the product can be encircled by a special graphic or a simple graphic, such as shown in exemplary FIG. 5C. The graphic can be any symbol, such as a circle, oval, box, star-shaped item or other indicia that is visually recognized by the viewer to enable the viewer to readily see the product available for purchase.

Figure 6:
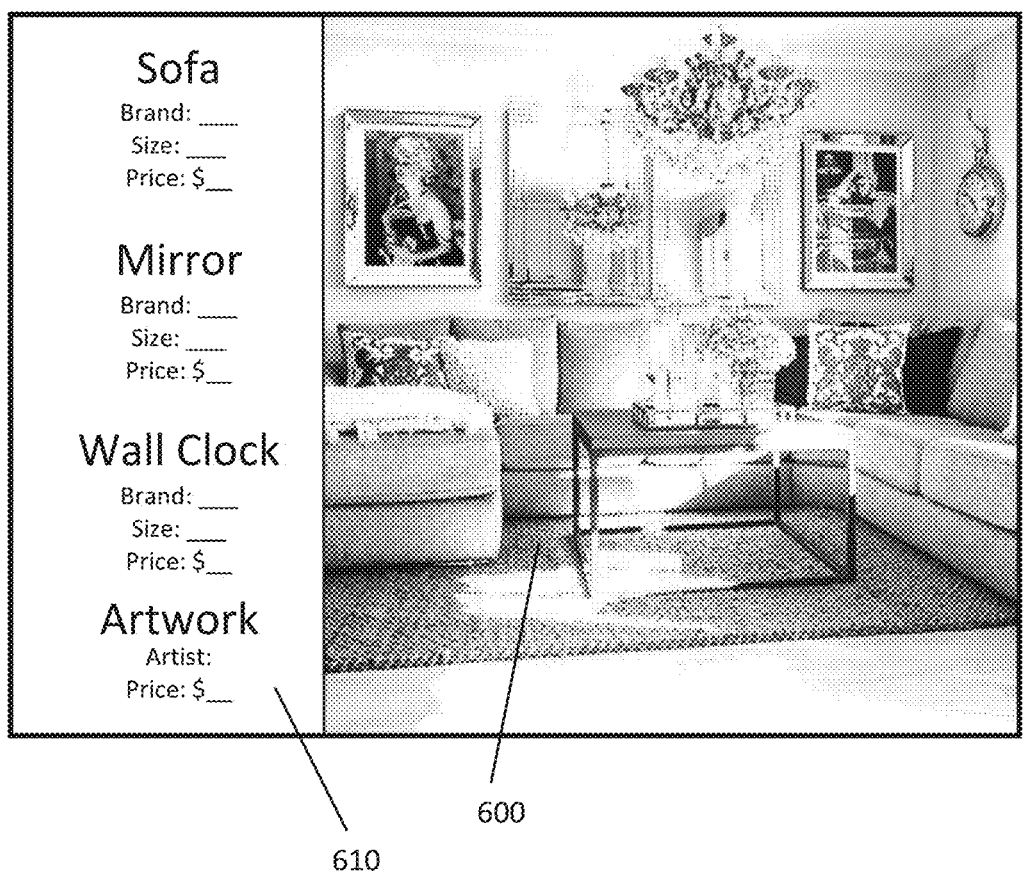
FIG. 6 schematically illustrates another manner of identifying products for purchase in accordance with the present invention.

In accordance with further embodiments, the product is identified in a different field or location (sometimes referred to herein as an auxiliary field or location) from where the digital content is presented. In one version, the size of the presented digital content is reduced to accommodate a side (or top or bottom) field and the product for purchase (or multiple products for purchase) are identified within that other field, along with other information about the product (e.g., its price). FIG. 6 is an example of identifying products for purchase in a field 610 adjacent to the digital content 600.

Figure 7:
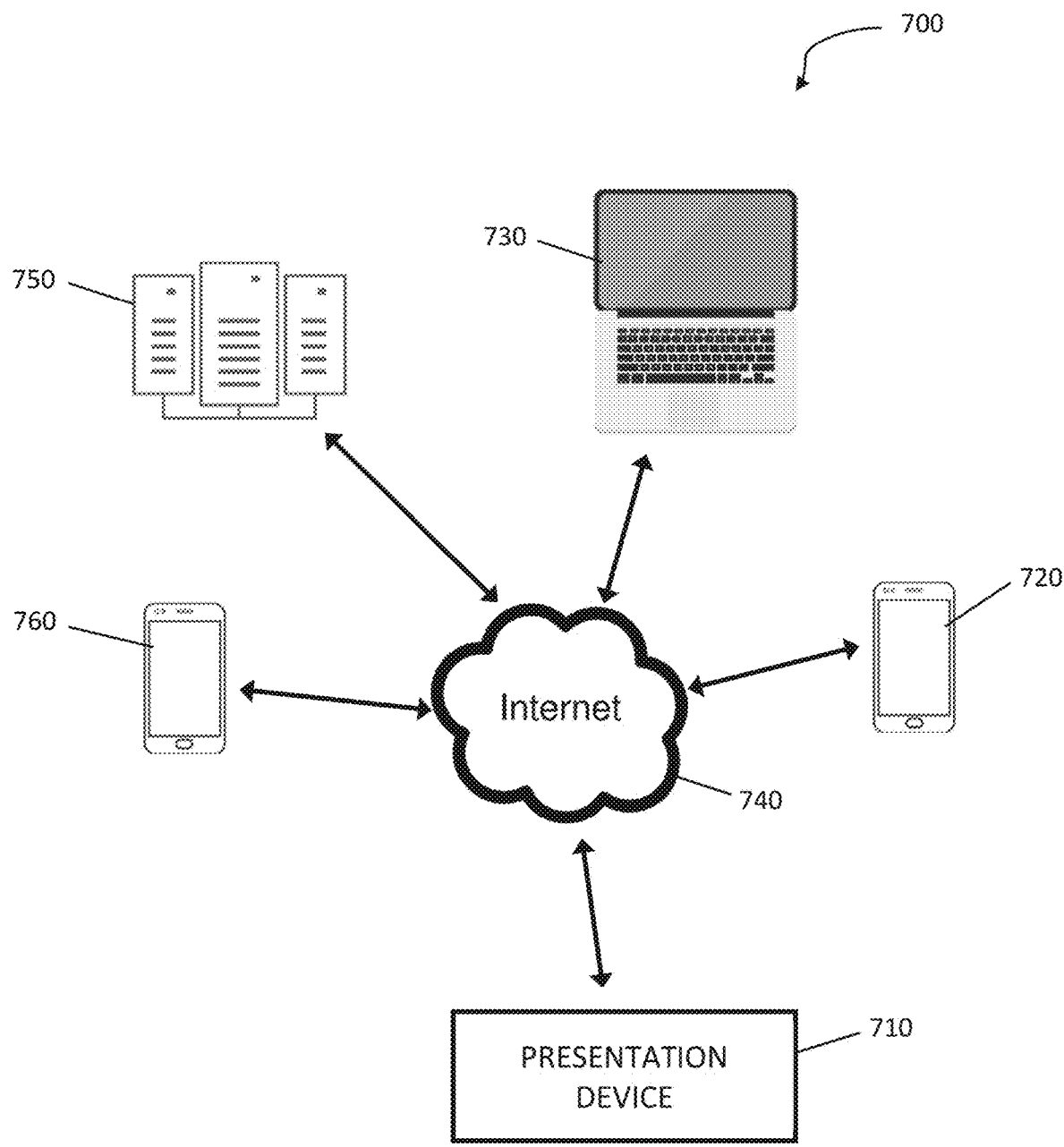
FIG. 7 is a schematic diagram of exemplary electronic devices that may be employed to present products available for purchase in accordance with the present invention.

In other embodiments, the products available for purchase are presented by another electronic device that is not presenting the digital content. FIG. 7 is a block diagram 700 that shows the electronic device 710 that is presenting the digital content (called "presentation device" herein) along with other exemplary electronic devices that can present the products available for purchase.

In accordance with the present invention, the viewer presets the identity of the electronic device to present the products available for purchase. For instance, the viewer can designate his/her own smart phone 720 (e.g., by providing the smart phone's cell number). The viewer can designate his/her computer 730. Any other type of electronic device can be designated. In addition, or alternatively, the viewer can designate his/her own email address, cell phone number, social media account, or other personal indicator (account name/ID in other applications) to enable the viewer to obtain the product available for purchase information on other electronic devices that the user is using or may intend to use.

The viewer can designate multiple devices to receive the products available for purchase information. Hence, the viewer can designate a portable electronic device being carried (e.g., smart phone) along with another device, such as a computer. As mentioned above, instead of designating the electronic device, the viewer can designate an email address, an account associated with an app, a social media platform, or other desired recipient device or platform. The information/data representing the products available for purchase may be delivered via the Internet 740 (or other network) in an email communication, via text messaging, as an HTML or XML web page, or other suitable communication technique (e.g., via a third-party server 750). Accordingly, products available for purchase are presented by the receiving device via the email, text message, an app suitably programmed in accordance with the present invention to enable selection/purchase of identified products, or other software and/or hardware vehicle.

Along with the viewer's own electronic device, the viewer can designate a friend's electronic device, such as the friend's smart phone 760 (e.g., the friend's cell phone number). Additional electronic devices and/or accounts and/or social media platforms can be designated to receive the products available for purchase information.

The products available for purchase can be provided to any of the foregoing identified devices, platforms, accounts, etc., for specific products particularly identified by the viewer. For instance, the present invention can be employed to create a gift registry (e.g., a bridal registry, a baby registry, etc.). A gift registry may be created in accordance with the present invention in various ways.

In one way, the viewer designates that a particular gift registry is to be created and then views digital content and selects products to be added to the gift registry (rather than designates that a product is to be purchased). Viewing various digital content, which may include websites of retailers and any other digital content mentioned here, may occur over time, such as over several days, weeks, etc. When the viewer is ready, the viewer then associates the gift registry with a particular social platform, guest list, service provider (e.g., third-party gift registry fulfillment company), etc. and the products that have designated to be included within the gift registry are sent off to the designated recipient or recipients.

In the case of a social media platform, the products within the gift registry are identified and may be quickly selected by friends, relatives, invited guests, and other folks for purchase. In the case of a guest list, each guest (via his/her email, text messaging, a suitable app, social media or other communication technique) receives the gift registry Like existing gift registries, as gifts are purchased, gifts available for purchase may change.

The gift registry may be created in a different manner than described above. In particular, instead of selecting the desired gifts first, the viewer can designate the manner of distribution of the gift registry first and then proceed to select gifts over a period of time. Desired products (or services) then are automatically added to the already presented gift registry as the viewer proceeds to add desired gifts. Multiple people (e.g., future bride and groom) may separately add desired gifts to the same gift registry.

Viewers can select things that are generally not defined as gifts, such as charities to which friends and other folks can make donations. The charities may relate to the digital content.

In the embodiments pertaining to charities, a list of charities seeking to help or provide assistance in connection with a worthy cause is displayed, thus enabling viewers to readily donate to a selected charity that can assist. For instance, during a program or news report about a particular tragedy, a list of appropriate charities designed to assist those injured in the tragedy (or to prevent future like tragedies, etc.) can be automatically presented to viewers or presented after a user action, at which point the viewer may select a desired charity and designate an amount of money to donate, which then promptly commences the donation. Viewers can preset an amount of money to donate (e.g., $100). If desired, viewers can also be provided with objective data about each listed charity and reviews so that donations can be appropriately decided.

In those embodiments that employ a device different from the electronic device that is presenting the digital content, the viewer or other person such as the viewer's friend or friends, social network, etc., there is no need to modify or otherwise obscure the presentation of the original digital content. These embodiments accordingly are highly suitable for use during presentation of a show, movie, etc., at a private event in which there are multiple viewers, at a public event where there may be many viewers, or in other situations.

Each viewer then, according to his/her select preset settings may (and will likely) receive different data to his/her select device that identifies products available for purchase. In such case, each viewer can indicate (e.g., within the app on his/her smart phone or other electronic device) the particular digital content being viewed on the separate electronic device. Then, the app in communication with the appropriate systems/servers operates as described herein to facilitate identification and selection of products available for purchase that are being presented within the digital content that is being presented by the other electronic device.

In one particular embodiment, the app on an individual user's electronic device can automatically identify the digital content being viewed via use of the device's camera and/or microphone. Then, by using known technologies to identify the digital content being presented (with the assistance of remote servers), the app is able to quickly identify the presented digital content and then initiate the herein-described processes for identifying presented products, performing data gathering and ultimately providing products available for purchase.

In a variation, the individual user's electronic device ascertains the digital content being viewed via data transmission between the user's device and the display device displaying the digital content. The data transmission can be direct (e.g., via Bluetooth) or indirect (via Wifi or other non-direct technique). In such case, the user's device can request the display device to identify the digital content being presented or to identify the station, streaming service or other source of the digital content along with other relevant information. Such information transmitted to the user's device should be sufficient to enable the user's device (with the assistance of third party servers) to identify the digital content being presented.

In a different embodiment/variation, a viewer can take a photo of the digital content being presented by a different electronic device and then use that photo to identify products available for purchase. Custom apps may be developed to facilitate these functions wherein a viewer is simply able to push a virtual button on his/her smart phone (or other device) and then the app does the rest, with the assistance of remote servers/systems as already discussed herein. In a simpler variation, the viewer can take a photo and then send the photo (via email, text messaging or other way) to another entity for processing. Data about products available for purchase then are transmitted back to the viewer to enable the viewer to subsequently purchase one or more products, if desired. A photo/image of a standard printed image (i.e., that is not a digital image), such as an ordinary sign (e.g., a painted or printed item), likewise can be taken and then analyzed for products therein.

QR Codes

Figure 8:
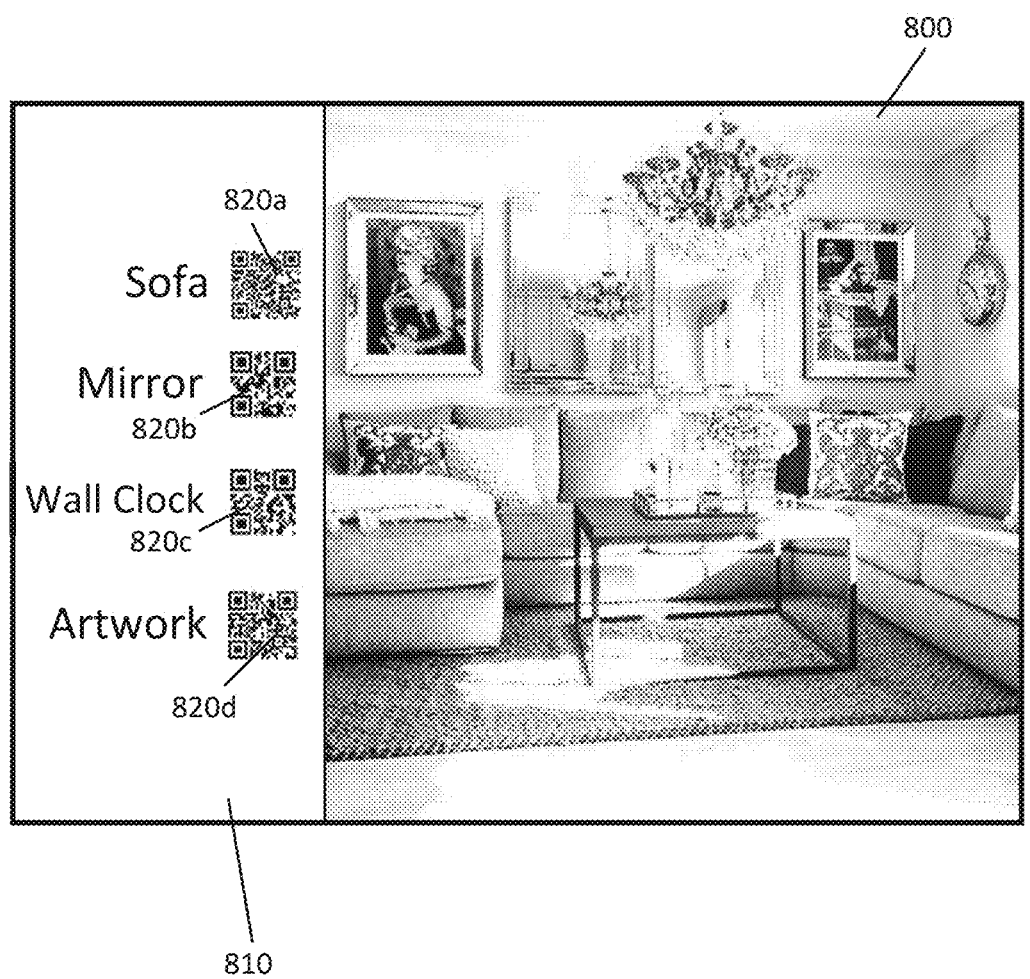
FIG. 8 shows a manner of employing QR codes to select items for purchase in accordance with the present invention.

In yet a further embodiment of the present invention, each product available for purchase is identified on the device presenting the digital content along with a QR code that can be read by a different electronic device of the viewer to initiate the purchase. In one implementation, such as shown in the exemplary image 800 of FIG. 8, as the digital content is being presented, a set of products available for purchase are identified in a different field 810 on the device presenting the digital content, and each product available for purchase is provided with its own unique QR code (820*a*, 820*b*, 820*c*, 820*d*).

Thereafter, a viewer can use his/her own electronic device (e.g., smart phone) to scan the QR code using a suitably programmed app. The app then transmits the data associated with the QR code to an external server that is able to process the communication to ultimately purchase the product associated with the QR code. The external device in this instance is in communication with one or more of the above-referenced servers that has associated a product available for purchase with the data set forth in the respective QR code. Other suitable indicia may be employed instead of using QR codes.

In various embodiments, including the foregoing embodiment that employs QR codes for each product, the present invention is well suited for public use or private use where there are multiple viewers of the same digital content (e.g., being presented on the same electronic device). Each viewer is able to use his/her own respective electronic device (e.g., smart phone) to select/purchase products that they individually desire to purchase.

In another embodiment, QR codes (or other unique indicia) can be employed with a program guide that identifies a set of programs. In such embodiment, each listed program has a respective QR code, whereupon selection (or imaging) of one of the displayed QR codes results in the identification of products for purchase that are presented/associated with the selected show. In one version, upon selection of a program (or scanning of the associated QR code), all products (within the show) that are available for purchase are presented. Fewer, select products may also be presented based on the viewer's preset settings.

In another embodiment, a viewer uses his/her electronic device, using a suitably programmed app, to image/scan a QR code (or other unique indicia, including a watermark) that is printed or otherwise presented on an actual product (i.e., not a digital version of that product) in order to purchase that product. For instance, certain manufacturers, importers, retailers, etc. may opt to allow purchasing to occur via use of the present invention by people who are in physical close proximity of products that may be purchased. As one example, an entity may have a "store" of products for sale, where each product has a unique QR code provided on the product (e.g., on a sticker on the product, on a hangtag, etc.). The store can be fixed at a certain location, moving (e.g., a travelling store), within a temporary display, a permanent or temporary exhibit, etc. By employing the present invention, retailers can sell products that are displayed and seen in person by potential customers, and those retailers can include digital content that present those same products that may be purchased by viewers of that digital content. The same QR codes can be used by both the actual products and displayed on electronic devices in the manner described above.

In a variation of the above-embodiment, rather than using QR or other codes on actual products that are visually viewable, those products may include RFID tags or other passive or active tags/technology that are detected by suitable electronic devices. Suitable technologies include near field communication (NFC), Bluetooth, iBeacon, etc. Accordingly, such embodiments may sense products without the need to visually image the product or a visual indicator on or near the product.

Each viewer using his/her own electronic device can employ the benefit of having his/her preset preferences established so that each viewer is able to have the products displayed for purchase customized, have other information associated about those products customized, have the purchasing process customized, and so on. Additional information about selected or preferred products can be provided to each individual viewer, as desired.

In certain embodiments, a viewer's preferred mobile device may be triggered to receive product information based on proximity of that mobile device to the electronic device presenting the digital content. Therefore, as a person is walking around (or moving via another mode of transportation, such as in a car), when the person is within a certain proximity (e.g., 10 feet) of a presentation device, the person's electronic device is triggered to receive select product information being presented by that presentation device. As the person moves away a sufficient distance, transmission of product information to the viewer's electronic device ceases. Accordingly, certain embodiments of the present invention may be particularly useful for certain shopping districts, such as malls, shopping centers, etc. As one example, each store within a shopping center may present advertisements on electronic devices, where multiple advertisements are presented over a period of time, whereupon people in close proximity to those electronic devices are provided with the immediate ability to readily purchase the particular product being advertised at a given moment in time.

In the above embodiments in which a person's proximity to an electronic device is relevant, a retail store (or other entity selling products/services) may employ the present invention in lieu of having a cashier "checkout" customers. For example, a retail store may have multiple departments, and each department includes electronic devices that present products sold within that respective department. As a consumer walks through one of those departments, the consumer's electronic device is presented with products within that department. The presented products may be those presented within advertisements (e.g., digital advertisement) or may include any product in that department. The consumer can select for purchase an identified product via the herein-described app. The purchased product can be obtained by the consumer in different ways: (1) the consumer can take the product (e.g., off a shelf); (2) the product can be mailed to the consumer: (3) the product can be gathered by staff and given to the consumer at the conclusion of shopping; or (4) other technique to provide the consumer with the products that have been purchased.

In accordance with other embodiments of the present invention, products provided to the consumer via his/her electronic device can be particularly tailored to those being digitally presented within the retail store (or even outside the retail store). Other manners of employing the present invention within the brick-and-mortar environment may be employed.

In accordance with the present invention, by sending product information to a second electronic device, the presented digital content is not interrupted or otherwise slowed down due to any transmission of product information. For example, the digital content may be displayed on a television, which is being watched by multiple viewers. One viewer specifies his/her smart phone as the preferred device for obtaining product information for products of interest presented in the digital content. A second viewer specifies his/her Internet-enabled watch for receiving product information about products of interest to that individual. Other viewers likewise have preselected the respective electronic device alone with respective types of products of interest.

In such embodiments, there is no delay in presentation of the digital content, even if there may be a delay in providing a particular viewer with product information. Moreover, individual viewers may opt to request additional information about a particular product of interest, and such requesting additional information has no impact on the original presentation of the digital content. Other benefits are herein discussed.

A product can be identified for purchase at different times. In certain embodiments, it can be done simultaneous with the presentation of the product within the digital content. In other embodiments, it can be done at a later time. For instance, in presentations that include commercials (e.g., during broadcast television), products available for purchase may be identified (alongside other data, such as price) during those commercials. Products available for purchase can be identified at the end of a particular video segment or at the end of the digital content altogether (e.g., after the completion of the show or movie). In other versions, products available for purchase can be presented at a preset date and/or time, such as 30 minutes after completion of the digital content, or other time, or at a date/time selected by the viewer.

In embodiments in which information about the product is presented on or alongside the actually displayed product, various embedding technologies may be employed. Manners of embedding or overlaying text and/or other visual information within digital content are well known and thus further discussion thereof is not provided except where necessary for an understanding of the present invention. For purposes of illustration, various techniques are discussed in U.S. Pat. No. 10,542,326 and U.S. Patent Application Publication Nos. 2016/0165314 and 2019/0373337, which are incorporated herein by reference. Other techniques for embedding or overlaying text or other visual information are discussed in other incorporated documents identified herein.

In various embodiments, any of the foregoing identified data about a particular product can be presented, such as its price, brand, etc., along with an indicator to purchase, such as "buy it now" or other suitable equivalent language, phrase, symbol (e.g., a "B" symbol in a certain font, size, color, etc.) that will particularly recognized and understand by the viewer. In the case of a gift registry, a "G" symbol (or other appropriate indicia) may be employed and selected by the viewer to add the identified product to the gift registry.

Figure 9:
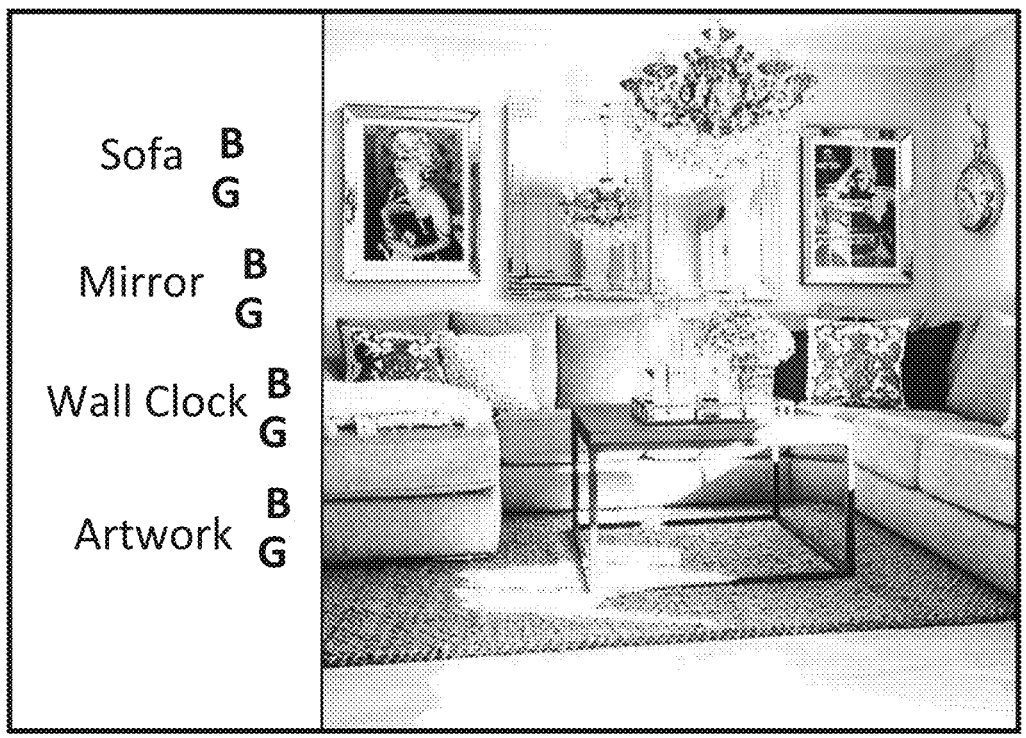
FIG. 9 shows an exemplary manner of presenting products available for purchase or for inclusion within a gift registry in accordance with the present invention.

FIG. 9 is an example of how symbols may be employed alongside products available for purchase or to be added to a gift registry. Numerous other examples exist. In a variation, selection by the viewer of something presented causes the system to present yet additional information to the viewer.

As an option, rather than immediately purchase an identified product (in the various embodiments, whether via the electronic device displaying the digital content or another electronic device, the viewer may visit a website or other server (e.g., of the brand owner) to obtain additional, supplemental information about the product and/or about local retailers of that product and/or about information regarding alternative products. The option to visit a website or to obtain other information can be presented to the viewer in different ways. For instance, a "W" symbol (or other appropriate symbol or word/phrase, such as "visit website" and the like) may be presented alongside a product identified for purchase. Visiting the website and the like can be a preset user preference so that selection of the product by that viewer automatically takes the viewer to the website or other place.

In some embodiments, the delivered product information may also include information about possible discounts, loyalty program rewards, limited offers along with customized or viewer-specific information that the viewer may be interested in connection with the selected and identified product or merchants that offer the product, or for the closest alternative products that are selected in accordance with one or more embodiments.

As discussed above, in various embodiments, social media platforms may be employed for identification of products presented within digital content, for searching and obtaining information about those products, and/or for enabling individuals (e.g., friends and other folks) to purchase specific products. A particular social platform (and other location to send information) may be provided as a viewer preset preference/setting and/or provided "on the fly" as a particular viewer is using the present invention. For instance, a viewer may be watching a program and decides, at that time, that select products identified within that program be sent to a particular social media platform. Using an appropriately programmed app within the viewer's electronic device (e.g., smart phone), the viewer designates the particular social platform to send the product information presented within that particular program only. Hence, viewer settings may be a universal setting (applicable to any program being watched/presented to the viewer) or may be made with respect to only the current digital content being presented.

The viewer may designate that the setting is for a particular amount of time (e.g., 1 hour, 2 days, 1 week, etc.) or be based upon other criteria, such as to designate select topics or products of interest. As another option, the devices to send product information may be specific to select products. For instance, clothing products can be selected to be sent to a first set of devices/recipients, whereas non-clothing products can be selected to be sent to a second set of devices/recipients. Thereafter, as digital content is presented and viewed by the viewer, and products are identified in any of the manners described herein, those identified products pertaining to a first category (e.g., clothing) are sent to the viewer's designated first set of devices/recipients (e.g., good friends), and similarly, those identified products pertaining to a second category (e.g., non-clothing, jewelry, vacation-related, etc.) are sent to the viewer's designated second set of devices/recipients (e.g., spouse, etc.). More than two categories may be designated, and categories may overlap with one another. Accordingly, the present invention enables individuals to fine-tune the transmission to select individuals of information about products/services of interest that the viewer encounters while watching video or other types of content.

5. Viewer Preferences

The various embodiments of the present invention as described herein may employ viewer preferences, as already discussed above. Viewer preferences may be preset by the viewer in advance, such as during setup of the viewer's account with an entity/system administering the present invention. For instance, during account setup, the viewer can be asked a set of questions about the type of products that are desired to be particularly identified and presented for purchase, and about the type of products where there is no interest.

In one version, the viewer can designate on a scale (e.g., from 1 to 5) for each group/type of product the amount of interest in potentially purchasing a product within that group/type. Accordingly, for products where there is absolutely no interest, the viewer may indicate such and, accordingly, the viewer in the future is not shown for purchase those types of products. Conversely, products or product types of high interest are identified and presented for purchase each time those products are included within digital content experienced by the viewer. As mentioned earlier, the same applies for services and other things/experiences, etc. generally not regarded as products.

A viewer can provide even a greater amount of preference information so that the system/process/invention can filter out (or filter in) select products within a category. For instance, a viewer can designate a preference to see clothing of select brands, as well as a preference to see no clothing by other select brands. As another example, a viewer can identify a preferred range of cost for each particular product. In accordance with the present invention, a product within the digital content that is well outside that range will not be presented for purchase and products within the cost range are presented for purchase. Products outside the range, but close to it, may be presented for purchase based on other factors, and other viewer preferences.

Viewer preferences may be established based on viewer demographics, including geography (where the viewer resides), marital status, whether the viewer has children, owns a home or rents, socio-economic data, etc.

Preferences can be further established based on historical activity of the viewer, including purchasing patterns, request for more information patterns about select products, and so on. Other historical activity of the viewer includes other purchasing/shopping patterns in physical stores or other online methodologies/platforms (e.g., via Amazon), as well as purchasing habits employed during use of the present invention. Still yet, additional historical data that can be employed includes browsing activity, social network interaction, auction bidding activity, searches, interests designated in social networks, and the like. Preferences may also include the types of apps installed, downloaded, or purchased by the viewer, and their frequency of use, and/or other activity by the viewer on an electronic device.

By employing artificial intelligence, viewer preferences are well established via any of the information mentioned above or other types of information about viewers that can be acquired from the viewer's electronic devices, the viewer's accounts, and/or public sources.

A viewer can preset/designate the type and amount of data that relates to products that are presented for purchase. The type/amount of data may be different for different categories of products. Viewer preferences, whether preset by the viewer and/or established using viewer data, can be set at any time and will likely change (i.e., evolve) as time passes.

Viewers desiring to purchase clothing and/or other products where size and other attributes of the product (e.g., color, material, etc.) are important can establish a personal profile that includes information about the viewer to better facilitate the automatic selection of product characteristics at the time of purchase. The personal profile accordingly includes any data about the viewer relevant to the purchase of clothing and the like. Such data includes all sizes relevant to certain products, including shoes, all types of clothing, hats, rings, etc. Relevant sizes include chest, waist, hips, inseam, neck, sleeve, finger, foot length, foot width, and the list goes on.

If available, the present invention can obtain such personal profile data from third parties, such as a clothing retailer, who may already have such information about a particular viewer. In certain embodiments, the present invention can employ digital image/3D modeling of a viewer utilizing images taken of the viewer. Other known methodologies of obtaining data for use within the personal profile data also may be employed.

In addition to the physical characteristics of a viewer, the viewer can further provide preference data, such as mentioned earlier, with respect to each particular type of product. Such preference data may include style(s) for each type of clothing, color, fabric, type of fit (tight, loose, etc.), and the like. Style(s), colors, fabrics, etc. that are undesired may also be provided to reduce the potential number of products that will be presented to the viewer for purchase.

The viewer may provide preference information with respect to various types of services, including any of the types of services mentioned herein. For instance, the viewer can identify the types of cuisines he/she prefers (and those that are disliked), preferred types, brands and styles of hotels, preferred types of destinations to visit, preferred interests and hobbies, etc. Information about any of these and other types of services also can be generated via AI applications utilizing historical activity of the viewer. Like products, the present invention may employ AI to ascertain best or suitable alternative services to offer.

A viewer can preset payment methods to facilitate automated purchasing of products that have been selected for purchase. Optionally, a viewer can enable use of already provided methods of payment, such as Apple Pay or PayPal or methods of payment identified in various platforms, such as on Amazon. Any known, appropriate manner of payment may be employed, including use of crypto-currency (e.g., Bitcoin), EFT (electronic funds transfers), etc.

Each user (i.e., viewer) of the present invention can establish his/her own account along with his/her own set of preferences as herein described. In certain embodiments, each viewer using his/her own electronic device receives uniquely customizable products for purchase based on products that are presented within digital content that is being watched by the respective viewer. Each viewer thus is able to enjoy the ability to readily purchase products for purchase, oftentimes by a single action, without the need to search for products, without the need to manually obtain information about those products, without the need to ascertain the seller or sellers of those products, and to enjoy the other benefits herein mentioned.

Multiple viewers of the same digital content (whether being presented on a single electronic device that is watched by those multiple viewers, or being presented on multiple electronic devices) can be (and will likely be) provided with their own uniquely established set of products for purchase. For instance, at one's home (or other location), several viewers are watching the same program and each viewer can employ the present invention via his/her own smart phone. Although each viewer is watching the same program, the types of products that are viewed that are indicated to each viewer to be available for purchase can be different, due to each viewer's settings, preset preferences, and other reasons mentioned herein.

6. Viewer Selection/Purchase of Identified Products

A viewer may select an identified product for purchase (FIG. 1, Step 150) in various ways and using any number of equipment. For many embodiments, the viewer will employ the input device of the electronic device that is particularly identifying products for purchase. As previously described, this may be the electronic device that is presenting the show or other digital content. In other situations, it may be a different electronic device, such as the viewer's smart phone.

The input device therefore includes any typical input device of various electronic devices, including a keyboard, mouse, remote control, touchscreen, game console, joystick, etc. In systems that include or are in communication with voice recognition systems (e.g., Amazon Alexa and Echo, Apple's Siri Personal Assistant, Microsoft Cortana, etc.), the input may be a verbal instruction.

In systems that employ or are communication with camera systems or other types of visual and/or motion sensor systems, the input may be a hand or body gesture (or other form of gesture). The present invention may be employed with gaming and/or virtual (or augmented) reality systems and the input may be verbal, hand gesture, body gesture or any type of input typical of those systems. Accordingly, gesturing, verbal instructions, the use of game consoles, joysticks, holographic console/keyboard, VR headgear input (iris, eye movement, etc.) and other devices used with such systems and/or within gaming systems may be employed as the input to initiate a purchase.

In various embodiments, the input device includes use of the electronic device's camera and/or microphone. For instance, in embodiments employing QR codes, the electronic device's camera takes an image of the QR code to facilitate the purchase of a particularly identified product.

In accordance with the present invention, a viewer employs an appropriate input device to select one or more products to purchase. In an environment in which an electronic device presenting the digital content also is identifying products for purchase, such as by a television, the app or other software being executed by the television allows the viewer to use the television's remote control to particularly select a product for immediate purchase. The input, however, may be via another device in communication with the television (e.g., any voice recognition system).

For electronic devices that include a touch screen, simply touching the touch screen where the product is presented for purchase initiates the product purchase. Numerous other examples exist. Moreover, since the particular software that would be employed in the various systems and embodiments mentioned herein are well within the ability of those of ordinary skill in the art given the discussion herein, a particular discussion of software/code is not provided except where particularly necessary for an understanding of the present invention.

Once a product(s) is selected, the system/method of the present invention proceeds to initiate the purchase (FIG. 1, Step 160). The electronic device employed by the viewer to select the item for purchase proceeds, with the assistance of remote servers, to commence the purchase. Based on user preferences, the selection by the user may be a single-action whereby the action operates as a "Buy Now" function.

If desired, selection by the user is followed by one or more requests for either further information from the viewer or a further confirmation to purchase the selected product(s). For instance, the viewer may be requested to identify color, style, size, etc., if such information is not preset by the viewer or preset via other means (e.g., using historical activity). The viewer may be requested to select quantity if not preset and/or is the type of product where multiple units are likely to be purchased (e.g., cosmetics, hair treatment products, and other regularly consumed/used products, etc.).

If not preset, the viewer may be requested to indicate method of delivery (e.g., same day, overnight, 2-day, regular, expedited, etc.). Different types of products may be preset to be delivered in different manners.

The manner(s) of financial payment preferably is preset so that payment authorization can be fully automated. As mentioned earlier, any appropriate manner of payment may be employed, including by credit card, debit, etc. The requisite financial information may be provided in advance (e.g., during account setup) by the viewer. The viewer may pre-authorize the system to employ other already known manners of payment, such as Apple Pay, PayPal, etc. Manners of payment, pre-authorization, and processes/systems that carry out financial payment of products in online ordering are well known and thus further description thereof is not provided. For example, payment authorization processes are described in U.S. Pat. No. 8,627,379 and U.S. Patent Application Publication No. 2015/0100989, which are incorporated herein by reference. Numerous other systems/processes/methodologies are known and any may be employed within the present invention.

In most instances, the purchasing steps/processes are controlled by electronic devices/servers separate and apart from the electronic device presenting the digital content and the electronic device being employed by the viewer, if different, to request the purchase. Beneficially, the digital content being presented by the presentation device continues to present the digital content without interruption. Moreover, in those embodiments in which the viewer employs a different electronic device to commence the purchase from the presentation device, the viewer's privacy is maintained. That is, other people (whether viewing the digital content or not) are not privy to the actual purchases being made by the viewer. In instances where product information is provided to other individuals (e.g., friends of the viewer, guests, etc.) in accordance with the various embodiments and options presented herein, those other individuals are able to designate a purchase of one or more products in like fashion. In yet a further embodiment, another individual designated to receive product information may have pre-settings him/herself to receive yet other products of interest that have been viewed by the first viewer.

Final processes necessary to complete the purchase, including delivery by the supplier of the products that have now been purchased, are well known and not described herein.

The invention employs secure transmission methodologies and other features standard within online purchasing systems. For instance, the present invention may employ private-public key encryption and a message identification code (a hash-based MAC) for authentication of transmissions and receipt of messages that particularly include private financial information or requests for financial information, or employ other industry-acceptable protocols.

The systems/processes of the present invention utilize industry-acceptable manners of verifying the identity of the viewer/purchaser or other purchaser during use of the present invention. In certain embodiments, the present invention employs facial recognition of the viewer to identify the viewer and to confirm his/her identity to enable automatic use of the present invention without the need for the viewer to take extra steps to login or that would otherwise slow down the process. An another option, voice recognition may be employed or other biometric data (e.g., fingerprint) may be obtained to identify and/or verify the identify of the viewer and/or other user of the present invention. Facial, voice and other biometric recognitions systems/processes are well known. For instance U.S. Pat. No. 9,530,048 discloses various facial recognition processes, which is incorporated herein by reference. As another example, Microsoft's Azure product, found at azure.microsoft.com, employs facial recognition using skin tone and color, among other things, to improve matching, and the contents at this website are incorporated herein by reference.

7. Gaming and Virtual Reality Environment

The present invention is particularly well suited for use within gaming and/or virtual reality environments, as briefly mentioned above. Content presented to users/viewers in a virtual reality environment ("VR digital content") will very likely include products (and services) that exist in the real world and the present invention enables viewers of VR digital content with the ability to readily purchase real-life versions of the VR products presented within the VR digital content. Accordingly, the foregoing discussion of identifying products within digital content (whether part of a product placement campaign or not), obtaining information about those identified products and then determining whether those products are available for purchase is equally applicable to the VR digital content environment.

In addition, products within the VR digital content can be automatically identified for purchase (i.e., their real-world counterparts) and/or can be manually selected by viewers. Viewer preferences, including viewers preset preferences, may be employed in the selection of the products presented within the VR digital content. Accordingly, the various embodiments described above with respect to viewer preferences, filtering in, filtering out, etc., may be applied to the VR environment.

In connection with viewer selection of VR presented products of interest, the viewer may utilize any suitable input device/methodology to select products within the VR digital content. Various selection devices include a console, mouse, keyboard, joystick, etc., or a virtual representation of any of these devices, a wrist input, verbal instruction, hand/body movement/gesturing, iris movement, head tracking, or other known input methodologies within VR systems.

Any suitable VR system for presenting the VR digital content may be employed. Exemplary devices/systems include holographic projectors, VR glasses, VR visors, VR suits, etc. The operation of many types of VR systems and technologies for enabling VR presentations are well known, such as discussed in U.S. Patent Application Publication Nos. 2019/0347858, 2019/0235619, and 2019/0369555, and U.S. Pat. No. 8,487,980, the disclosures of which are incorporated herein by reference.

Whether products within VR digital content are automatically identified or manually selected by the viewer, the corresponding real-life products available for purchase (if indeed available for purchase) are presented to the viewer in any manner described herein. For instance, the visual representation of the identified VR product may be modified so that the viewer immediately ascertains that the identified product is available for purchase (in the real-world). Other techniques for visually distinguishing the product may be employed.

The product or products available for purchase may be presented within the VR environment (i.e., the "VR space") as separate elements (e.g., in a different field of view or location as the original VR digital content). Moreover, identified products available for purchase can be presented within a different VR space as the original VR digital content. For instance, products available for purchase may be presented within the viewer's VR space at the discretion of the viewer. As one example, the viewer is able to go into a VR space that shows the products available for purchase upon making an appropriate gesture or instruction. In one version, upon making such an instruction, the products are presented in the viewer's VR space without the original VR digital content. In another version, the original VR digital content remains and the products are either superimposed over the original VR digital content or placed to the side (or above or other location).

In light of the expansive nature of the VR environment, products available for purchase can be organized in different ways and then be presented to the viewer in different VR spaces. For instance, clothing products available for purchase (in the real-world) may be provided in one VR space and non-clothing products available for purchase are provided in a different VR space. The viewer may then "switch" views between experiencing the original VR digital content, the VR space that shows the clothing products for purchase, and the VR space that shows the non-clothing products for purchase. View switching may be achieved in any manner. Moreover, products may be organized in different ways and such organization may be preset by the viewer. Further, any number of VR spaces that show products available for purchase may be created, as appropriate or desired.

Like the real-world embodiments described above, the viewer in the VR environment can immediately purchase one or more products that are presented for purchase, or request additional information about any product, or perform other activity herein-described (e.g., go the retailer website of the seller of the real-world version of a product, add a product to a gift registry, send the product to other electronic devices, add the product to a social media platform, etc.).

In certain embodiments, real-world products available for purchase can be provided to and presented in other electronic devices. Any of the embodiments described above with respect to employing electronic devices in addition to the device presenting the digital content may be employed in the VR embodiments of the present invention. For instance, the viewer may designate that identified products be provided on his/her smart phone (e.g., via a suitable app, text, email, etc.). Then, the viewer may desire to select and purchase particular products after enjoying the VR experience. The viewer can designate devices of other people, social platforms, etc.

The present invention may be applied within other virtual-type systems and environments, including game and non-game environments. The present invention may be employed within online systems/environments (whether 2-dimension or 3-dimension environments) that pertain to virtual games, virtual fantasy/world, virtual shopping, virtual-related education, etc. For instance, in virtual world environments, it is common for users to create an avatar to represent themselves within the virtual environment. In certain embodiments of the present invention, the user (viewer) is enabled to purchase the real-world version of clothing and other products worn or otherwise experienced by the avatar of that viewer.

As one example, during virtual-reality heli-skiing, a user of the VR system can purchase real-world versions of the clothing, footwear, headwear (e.g., ski mask), skis, and other items worn or used by the avatar. As another example, in the online role-playing game "Kim Kardashian: Hollywood," players seek virtual fame, purchase clothing and accessories for their avatars (using real money), among other things. By employing the present invention, real-world versions of the clothing and other products experienced by the player's avatar are available for purchase, as well as clothing of other players that are viewer, among other things within the game.

As yet a further example, players within a VR world can purchase real-world services that are experienced within the digital realm, such as travel packages to places virtually experienced, among the many other types of services that generally are experienced within many VR systems, apps, etc.

8. Additional Exemplary Applications

As described, the present invention selects or automatically identifies/selects products and services within digital content, such as a movie, show, etc., to ascertain whether it is available for purchase, and then enables the viewer (and other individuals) to readily purchase one or more of those products.

The present invention may be employed during numerous scenarios that go beyond watching a movie or show. For instance, the present invention may be employed while viewing or otherwise taking part in activity for yoga, exercise, meditation, other fitness exercise, whether for physical, mental, spiritual, entertainment or other purpose. The digital content being presented to the viewer may have been recorded/created in advance, such as with movies, but the present invention may also be employed during live performances, such as live concerts, live religious presentations/services, live broadcasts (e.g., news reporting), etc. The present invention may be employed during digital presentations intended for relatively small audiences, such as subscription-based services, concerts and other performances that require pre-purchase, pre-registration and the like. The present invention may be employed within industry-type events, such as trade show presentations, video-conferencing type presentations (e.g., Zoom meetings), and the like.

As discussed earlier, the present invention is well suited for the gaming and virtual reality realms. In addition, the present invention is well suited to be employed within the augmented reality (integration of real world and digital world) realm, wherein the present invention identifies products viewed within the real world that are available for purchase and/or identifies products virtually created that are available for purchase.

9. E-Books

The present invention is not limited to audio-visual digital presentations. Each of the aspect, features, steps, methods, etc. as described herein may be employed within visual including text-alone type presentation systems/devices, such as E-Books, along with digital signage, digital displays, and other like environments.

In particular, different types of product placement campaigns may be employed within E-Books and the other types of environments mentioned above. Product placement campaigns and non-campaign use of products within textual descriptions are identified in certain embodiments of the present invention. In addition, visual images of products may accompany the textual descriptions or be presented without the textual descriptions. In any of these situations, the present invention identifies products available for purchase in manners described herein.

With respect to textual descriptions of products (as well as services), hyperlinks within the text may be employed to identify products and their availability for purchase. Metadata and other data stored/delivered with the textual data likewise is utilized for this purpose. With respect to the textual description of products, the present invention employs AI-driven context-based analysis methodologies/systems to identify products that are discussed within the text. Since such methodologies/systems are well known, further discussion thereof is not provided except where particularly necessary for an understanding of the present invention.

As a viewer "turns" a page within an E-reader device that is employing the methodologies of the present invention, the information on the newly presented page is analyzed to identify products that are identified, described and/or displayed and then proceeds to ascertain their availability. In certain embodiments (or based upon user preference), the entire contents of the e-book is analyzed in advance so that product availability information is immediately presented to the viewer upon turning a page or at another time (e.g., at the end of each chapter, section, etc.). The variations of when products are presented to the viewer as discussed earlier are applicable to e-books and other forms of visual only content.

Products may automatically be identified by the e-book device (or other electronic device) employing the present invention or may be manually selected by the viewer. In the case of manual selection, the viewer can manually designate one or more products in manners previously identified. For instance, the viewer can touch the word or words that pertain to the product (i.e., touch the screen at the location where the product is identified) and then the system proceeds to ascertain its availability.

For generic products, the use of AI and viewer preferences enable the system (in any of the embodiments discussed herein) to better ascertain the specific product or products that may be of interest for the viewer to purchase. In certain situations, too many types of the product in interest exist and in certain embodiments and possibly based on user presets, the present invention presents multiple forms of those products for selection by the viewer. The viewer then selects one form and the system proceeds to ascertain the availability for purchase of the selected form of that product. Hence, viewer selection, sub-selection and if necessary further sub-selections, enables the system/process of the present invention to then present to the viewer a particular form of a product available for purchase. For example, the product chandelier may be presented in the text, but further information is needed from the viewer to ascertain one or more specific chandeliers to present for purchase.

Products that are identified as being available for purchase may be presented to the viewer in various ways. Textual and/or graphic representations of the product may be (in the e-reader embodiment, but also is applicable in any other embodiment) superimposed over the text and/or may be presented in a different field of the display device (e.g., in the left, top or other margin). Various manners of presenting the products available for purchase as described above (with audio-visual type electronic devices) may be employed. Also, as mentioned in the above embodiments, products and information about those products may be supplied to other electronic devices (e.g., the viewer's smart phone, computer, etc.) and then those devices may be employed to initiate a purchase.

Any manner described herein may be employed to select one or more products presented within the e-book (or other visual device). For example, in addition to touch screen-selection to purchase a product, the viewer can verbally identify the product to be purchased. The e-book or other electronic device, employing speech recognition technology, is able to then carry out the subsequent purchasing operation. The viewer may employ another device to image a code (e.g., a QR code) presented on the e-book to identify the item to be purchased. Other features and variations mentioned earlier to initiate a selection/purchase of a product may be employed in this context.

Like the earlier described embodiments, the e-book reader communicates with $3^{rd}$-party devices, such as any of the servers mentioned herein, to facilitate the functions of the present invention.

In addition to audio-visual content and visual content alone, the present invention is applicable to audio content along, such as audio books and audio reading electronic devices.

10. Other Applications: Outside of Digital Presentation Content

In certain embodiments, the present invention may be employed to determine whether "real world" products (i.e., not digitally reproduced) are available for purchase. In accordance with the present invention, the viewer uses his/her portable electronic device (e.g., smart phone) to take a photo of an actual item or scenery they see, and then a suitable programmed app running on the smart phone employs the herein-described processes/steps to identify whether products within that photograph are available for purchase.

Similarly, the viewer may take a video (i.e., motion video) of something he/she sees, and then the present invention is employed as herein-described to identify products available for purchase throughout the entire video.

For example, the viewer may see another person wearing something of interest (e.g., a handbag, dress, shoes, etc.) and may simply take a photo of that person to ascertain the products being worn that are available for purchase and, in most instances, for immediate purchase. As another example, the viewer may see a product within a museum, an office building, while a guest at someone's house, or other location, and the viewer can take a photo of the product of interest to determine its availability for purchase.

As a further example, the present invention may be employed by viewers using their own smart phones (or other portable electronic devices) to facilitate purchases of products worn or otherwise presented during a live show, such as a fashion show. In such example, viewers can purchase the clothing, jewelry, footwear, headwear, etc. worn or otherwise held or used by the models during the fashion show. In addition, the present invention can be employed to enable purchasing of specific products that are not necessarily easily identified by the viewers themselves, such as the hair and makeup products used by the models during the performance. For live performances, the present invention employs other data provided in advance (or during or after) to facilitate the proper identification of such products.

In the case of shows presented via digital content (whether live or not), the present invention also enables viewers to purchase products not easily recognizable by viewers or, in some instances, via computer processing, such as cosmetic products, hair products, etc., worn by individual within the digital content. Data about such products may be embedded within the digital content to enable its identification and availability (e.g., source), or other techniques discussed herein may be employed to identify such products.

In yet a further embodiment, the present invention enables the viewer to ascertain whether products displayed or otherwise presented within already taken still photos or motion video (e.g., photo albums, home movies, etc.) are available for purchase. In such embodiments, the viewer using his/her electronic device acquires the still photo(s) or video, which can be done in various ways, and then transmits that photo or video to a service that processes the photo or video in accordance with the present invention. The device may acquire the already printed photo by taking a photo of the printed photo. The viewer or otherwise may scan the photo or convert the printed photo to electronic form in another known manner. In the case of a video, the video (depending on its form and where it is saved) is transmitted directly (or indirectly) to the service that then processes the video in accordance with the present invention.

11. Purchase/Obtaining Goods for Use in Digital World

In accordance with yet further embodiments of the present invention, goods and/or services that are purchased or otherwise obtained (e.g., via donation, gift or other means) as described in any of the embodiments presented herein may be employed for use in the digital world. As used herein, the digital world includes the virtual-reality realm, whether appearing artificial or appearing life-like or partial life-like, and further includes digital reproduction of the real world. Several embodiments and examples thereof are described below.

In accordance with particular embodiments, a viewer of a television show, movie, advertisement, etc. (or other digital source or non-digital source) is able to utilize the present invention to purchase a product for use for his/her own avatar. The avatar may be one used within a digital game, a digital experience or other digital representation. Here, the product may be any product that can be used, worn by the avatar or to accompany the avatar. For instance, any clothing item may be purchased. Other examples include jewelry, weapons (for appropriate type games or other digital experiences), etc. As one particular example, while watching a moving that shows a person wielding a certain type of sword, the present invention allows the viewer to purchase (or license) a digital representation of that sword for subsequent use during a digital game or other digital experience that shows the avatar with that particular type of sword.

In yet further embodiments of the present invention, the product(s) purchased is for use within social media and other digital platforms that present the viewer (or his/her friend, relative or other designated person). For instance, in a web-type business meeting (e.g., a WebEx, Zoom, etc.), the web meeting provider displays the person to other viewers with the digital product superimposed or otherwise digitally embedded within the digital image so that the person appears to be wearing, holding, using, or otherwise having the purchased product. Typical examples of products include any form of clothing product, footwear, jewelry, hats, eyeglasses, etc. Examples of purchasable products to be held by a viewer include pens, watches, etc.

In accordance with yet further embodiments, products for purchase that are intended to be used on or by a person are employed by the present invention to change the appearance of the person in accordance with the intended use of such product. For instance, upon purchase of digital versions of real-world cosmetics by the viewer in accordance with the present invention causes the display of that viewer within designated social media and other digital platforms and environments as if that viewer is wearing the purchased cosmetics. As one example, the purchase of a digital version of lipstick of a certain shade automatically causes the viewer to appear to be wearing that lipstick (of that certain shade) in the digital realm. In such embodiments (and in other embodiments as is applicable), the viewer is able to preset or otherwise designate the digital platforms, social media and other digital environments (including digital business meetings, social experiences, etc.) to present the viewer as if the product(s) is applied in order to modify the viewer's visual appearance during use of such digital environments.

As a particular feature of this embodiment (and other embodiments, as appropriate), the viewer can designate when, where and/or how products are to be applied to alter the visual appearance of the viewer (or other designated person). For instance, the viewer can designate a purchased product to be used/applied only in the evening. As another example, the viewer can designate a purchased product to be used/applied during social functions only (i.e., not during business functions). Other ways to designate categories of events, categories of dates/time, categories of places, and other forms of categories may be employed.

In accordance with the present invention, products viewed in any of the embodiments described herein may be purchased (as a digital product) for use as a background item or other purpose during which the product is not worn or applied to the viewer. For instance, digital representations of a painting, chair, bookcase, etc., may be purchased for use in the background (e.g., to the side, behind, in front, above or below) of the viewer.

In addition to the purchase of digital representations of individual products, the present invention may be employed to purchase a set of products for use by the viewer or to be displayed with the viewer. As one example, while watching a particular movie, the viewer can purchase a digital representation of the room within a home that is being shown in the movie. Then, in accordance with the present invention, the digital representation is appropriately purchased or licensed for the intended use by the viewer in the appropriate digital scenarios. Then, the viewer may provide the purchased (or licensed) room as his/her virtual background in the digital media. As another example, the viewer may purchase (or license) the exterior scene being viewed for subsequent use.

Modifying digital representations of people, places and things to embed or otherwise include other digital products, and modifying digital representations of people for enhancement or other modification of appearance (e.g., to apply cosmetics) is well understood and well known to those of ordinary skill in the art and therefore a description of the digital image processing to modify digital representations is not provided herein except where necessary for an understanding of the present invention. For illustrative purposes, the following patents and published applications pertain to modifying digital images and other things: U.S. Pat. Nos. 9,014,509; 10,269,100; 10,200,652; 10,116,901; 9,384,384; 9,232,18; U.S. Published Patent Application No. 2019/0266778; and U.S. Published Patent Application No. 2013/0169827, each of which is incorporated herein by reference. Many other published documents similarly describe processes/structures that may be employed within the present invention.

The many embodiments and variations thereof discussed herein pertain to the purchase of real-world products and/or services (i.e., for use in the real world) based on real-world products that are viewed or presented within digital media (e.g., within television shows, movies, etc.). The present invention also includes embodiments that pertain to the purchase of products and/or services for use in the real world based on what is viewed or presented strictly in the digital world (e.g. purchasing a real-world product based on what is worn by a digital character/avatar). The present invention also includes embodiments that pertain to the purchase (or license) of digital representations of real-world products that are viewed, displayed or otherwise included within presentations (e.g., television shows). The present invention further includes embodiments that pertain to the purchase (or license) of digital representations of virtual-type products presented strictly in the digital world. It is appreciated that the features and variations thereof that are described to any one embodiment may be applied (if not inconsistent) to another described embodiment. Viewers may purchase/license products for themselves or for others.

In addition to the foregoing, the above embodiments may be modified to allow a viewer to both purchase a selected product (or products) and simultaneously purchase (or license) a digital representation of the selected product. In yet another variation, upon selection of a product, the viewer is prompted to indicate whether to purchase a real-world version of that product and/or a digital representation of that product. The additional embodiments and variations may be employed with respect to the selection of a clearly real-world product, such as an object presented in a movie or television show, or with respect to the selection of a virtual-type product that is presented strictly within the digital world. As used herein, the phrase strictly presented within the digital world includes an item that is not available in the real world as of the time of the selection, but also includes an item that is available in the real world but not necessarily associated with the item digitally presented. In the case of items of obtaining items not readily available within the real world, the present invention optionally includes additional steps/functionality to seek if one or more third parties are able to manufacture or otherwise obtain suitable real-world versions of the selected virtual-type product.

As indicated above, the viewer is able to establish presets as well as preferences that allow for the use of the purchased products, including where (e.g., which digital platforms are applicable), when to use certain products (e.g., time of day, day of week, season, if for personal or business or other, etc.), and how to use certain products (e.g., the extent of modification to the viewer's appearance, to designate the size of the product or other designated change, etc.). Given such presets and preferences, viewers are able to establish a wide variety of controls of how purchased products are employed, whether employed during the use of digital games, social media platforms and other social experiences, the business arena (whether during business e-meetings and business functions), family and/or friend gatherings, for pure enjoyment purposes (games and beyond games) and any other purchase and/or any other digital realm.

12. Use of Viewer Location/GPS

The present invention in many instances utilizes the current location of the viewer and, in certain instances, the home residence and/or vacation residence of the viewer in ascertaining the types of products and services to offer for purchase.

The location of the presentation device is identified based on a number of factors, including the digital content being presented, the service provider of that digital content, GPS data provided by the electronic device presenting the digital content if available, and other information that can be acquired by the presentation device. In cases where the viewer is employing a different electronic device, such as when products available for purchase are provided to another electronic device, the location of that other electronic device can be obtained in various ways. In the case of smart phones, tablets and other electronic devices, such equipment has GPS capability and the present invention accordingly obtains the current location of those devices during use.

Location information is needed to assess delivery costs and timeframes. A viewer may desire to visit a retail location offering the identified product and, accordingly, the present invention identifies retailer locations closest to the current location of the viewer.

Viewer location is particularly helpful for service-related offers. Restaurants, entertainment services (shows, sporting events, etc.), tourism services, etc. are particular to location. When travelling, the present invention allows the viewer with the immediate ability to purchase services, as well as goods, that are distinct to the viewer's current location or intended location in the event the viewer plans to travel in the near or distant future. Based on viewer input or with the assistance of AI, goods and services unique to a certain area/location can be provided to the viewer based on the digital content being presented to the viewer.

In embodiments in which the viewer's portable device is employed to image content (whether digital or real), the current location of the viewer (i.e., the location of the portable device) is particularly helpful to enable the system of the present invention to identify product and service availability. In accordance with the present invention, the viewer can be provided with the option of receiving goods while travelling (i.e., when not home) or to receive purchased products at his/her home.

In the context of travelling, the present invention is able to translate products into the viewer's native or preferred language. Even when not travelling, translation services may be employed during identification of products/services within shows presented in a language different from the viewer's preferred language. Product information may be provided in multiple languages, if desired.

As stated above, various processes and concepts are well known and thus detailed descriptions thereof are not provided. For purposes of illustration, various published documents are incorporated herein by reference. In addition to those previously identified, the following published documents disclose and describe other functions that are referenced and/or that may be employed or otherwise used within the various embodiments of the present invention: U.S. Published Patent Application 2019/0104325, entitled "Event Streaming with Added Content and Context"; U.S. Published Patent Application 2015/0245103, entitled "Systems and Methods for Identifying, Interacting With and Purchasing Items of Interest In a Video"; U.S. Published Patent Application 2015/0215674, entitled "Interactive Streaming Video"; U.S. Published Patent Application 2019/0041797, entitled "Holographic Projector"; and U.S. Published Patent Application 2012/0062968, entitled "Three-Dimensional Image Projection Device," each of which is incorporated herein by reference.

As illustrated, the present invention employs multiple devices and purchasing by viewers is achieved regardless of the specific type of device employed and regardless of the type of platform, operator of that platform, manufacturer of each device, and so on. That is, the present invention is not limited to the use of a single operator, a single platform, a single type of device, etc. For purposes of illustration, a show may be viewed on one device in one platform (e.g., via an Amazon controlled platform) and then presentation of products available for purchase may be presented on a different device via a different platform controlled by a different entity. Hence, the present invention is applicable to any type of device capable of carrying out the various functions as described herein (within the relevant embodiment) and applicable to any operator.

Moreover, while the present invention has been described in terms of a viewer or viewers watching (or otherwise perceiving) digital content (and, in various embodiments, watching real-world non-digital content), the present invention may actually be employed without a particular viewer (or particular viewers) having watched any amount of the digital content. That is, a user of the present invention can identify particular digital content (e.g., select a particular content within a menu, such as on Netflix, Amazon Prime, or other source) and then request that products/services presented within that digital content (and subject to preferences, preset, etc., if any) be presented for purchase to the user. For instance, a user of the present invention may desire to be provided with jewelry (or other products/services) for purchase that is presented within a movie that the user has no interest in viewing, or perhaps the user would like to see such products in advance of watching the digital content, or any other desired reason.

Having described the present invention and its numerous features and benefits, it should be appreciated that the present invention includes any and all possible combinations of the disclosed subject matter. Thus, even if a particular embodiment is not discussed as including a feature in a different embodiment, the present invention embodies such feature in any suitable embodiment, and accordingly such particular embodiment optionally includes said particular features of said different embodiment.

Various steps or substeps may be omitted, and various additional steps & substeps may be added.

Unless otherwise stated, the singular includes the plural in further variations and the plural includes the singular in other further variations of any particular described embodiment, feature, element, step or other thing mentioned herein.

Unless otherwise stated, communication between two devices includes direct communication (e.g., Bluetooth communication between two devices directly) and indirect communication. The term "coupled" and the like include both direct and indirect coupling.

Discussions pertaining to a computer, server, processor, electronic device, computing device, and the like shall include a combination of multiple devices. Language relating to a computer, computing device, electronic device, and the like includes any suitable combination of computing devices, including servers, systems, databases, controllers, engines, interfaces, or other types of devices generally recognized to be used within or associated with computing devices.

Computer, computing devices and electronic devices employ a processor configured to execute software instructions that is stored on a tangible, non-transitory computer readable storage medium. Computers, computing devices and electronic devices, along with their associated processors and the tangible, non-transitory computer readable storage mediums are well known in the art.

The present invention also has been described in various instances as carrying out certain processes or steps. Such processes or steps are carried out by appropriate computers, computing devices, electronic devices, processors or other known components capable of carrying out those processes or steps. Hence, even if structural devices are not always mentioned within each of the various sections presented herein, the foregoing mentioned structural devices, such as a processor, computer, computing system, electronic device, etc., represent the structures that may be used in the present invention.

Moreover, the present invention has described a multitude of processes in terms of functions, steps, objectives, and other things, and given the discussion herein, and in light of the discussion herein, a person of ordinary skill in the art to which the present invention applies is able to generate the corresponding code, software applications and "apps."

Custom apps may be developed to facilitate these functions wherein a viewer is simply able to push a virtual button on his/her smart phone (or other device) and then the app does the rest, with the assistance of remote servers/systems as already discussed herein.

Having described the present invention including various features and variations thereof, it is intended that the appended claims be interpreted as including the embodiments described herein, the alternatives mentioned above, and all equivalents thereto.

What is claimed is:

1. An automated method for identifying for purchase one or more products in digital content, comprising:
    displaying digital content on a display of an electronic display device, the digital content representing at least one product;
    analyzing via one or more processors the digital content to identify the product;
    ascertaining via said one or more processors any product placement data associated with the product;
    communicating electronically, if there is no product placement data associated with the product, data representing the identified product or data corresponding to the product with at least one external server over a computer network, said at least one external server representing a recognition server;
    receiving a recognized product from the recognition server that performs product recognition processing on the communicated data to ascertain the recognized product;
    ascertaining via data from one or more external servers if the recognized product is available for purchase;
    receiving input from a viewer of the digital content to initiate purchase of the recognized product available for purchase.

2. The method of claim 1, comprising receiving by the display device viewer input corresponding to a viewer triggering action; and wherein the analyzing step is carried out in accordance with the viewer triggering action upon receipt of the viewer triggering action.

3. The method of claim 2, wherein the viewer triggering action represents a pause of the display of the digital content on the display device so that the display device continuously displays a single frame of the digital content; and the analyzing step identifies one or more products displayed within the single frame of the digital content.

4. The method of claim 2, wherein the viewer triggering action represents a viewer identification of a product being displayed within the digital content by the display device; and the analyzing step identifies the viewer identified product.

5. The method of claim 4, wherein viewer identification of a product is carried out by the viewer using a hand or body gesture by the viewer during use of a virtual reality device.

6. The method of claim 1, wherein the analyzing, ascertaining, communicating, performing and ascertaining steps are carried out during said displaying of the digital content without input from the viewer.

7. The method of claim 6, wherein the step of analyzing the digital content to identify the product is carried out in advance of displaying on the display device the digital content representing the product.

8. The method of claim 1, wherein performing product recognition processing is carried out by a processor of the recognition server executing computer software based on comparison and analysis of one or more distinct features of the digital content representing said at least one product.

9. The method of claim 8, wherein the one or more distinct features comprises a brand of the product as represented within the digital content.

10. The method of claim 9, wherein performing product recognition processing comprises accessing a database of products corresponding to the brand and comparing the digital content to characteristics of the products within the database to identify one of the products within the database as the recognized product.

11. The method of claim 1, wherein displaying digital content on the display of the electronic display device comprises identifying the recognized product ascertained available for purchase in an auxiliary location of the display of the electronic display device different from a location at which the digital content is displayed on the display of the electronic display device.

12. The method of claim 11, comprising:
    displaying a 2D or 3d computable readable code corresponding to the recognized product within the auxiliary location of the display in association with the identification of the recognized product in the auxiliary location of the display;

wherein receiving input from the viewer comprises receiving data corresponding to the imaged computer readable code, the imaged computer readable code being taken by an electronic device different from the electronic display device displaying the digital content and the computer readable code.

13. The method of claim 12, wherein the electronic display device is a non-portable display and the electronic device used to image the computer readable code is a smart phone of the viewer.

* * * * *